United States Patent
Brewer

(10) Patent No.: US 11,995,332 B2
(45) Date of Patent: May 28, 2024

(54) FINE GRAINED RESOURCE MANAGEMENT FOR ROLLBACK MEMORY OPERATIONS

(71) Applicant: Micron Technology, Inc., Boise, ID (US)

(72) Inventor: Tony M. Brewer, Plano, TX (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/716,250

(22) Filed: Apr. 8, 2022

(65) Prior Publication Data

US 2023/0325100 A1   Oct. 12, 2023

(51) Int. Cl.
   *G06F 3/06* (2006.01)

(52) U.S. Cl.
   CPC .......... *G06F 3/0644* (2013.01); *G06F 3/0607* (2013.01); *G06F 3/065* (2013.01); *G06F 3/067* (2013.01)

(58) Field of Classification Search
   CPC ...... G06F 3/0644; G06F 3/0607; G06F 3/065; G06F 3/067
   USPC ....................................................... 711/154
   See application file for complete search history.

(56) References Cited

U.S. PATENT DOCUMENTS

| 8,122,229 B2 | 2/2012 | Wallach et al. |
| 8,156,307 B2 | 4/2012 | Wallach et al. |
| 8,205,066 B2 | 6/2012 | Brewer et al. |
| 8,423,745 B1 | 4/2013 | Brewer |
| 8,516,021 B2 | 8/2013 | Aronovich et al. |
| 8,561,037 B2 | 10/2013 | Brewer et al. |
| 9,710,384 B2 | 7/2017 | Wallach et al. |
| 9,875,042 B1* | 1/2018 | Natanzon ............. G06F 11/1471 |
| 9,959,061 B1* | 5/2018 | Natanzon .............. G06F 3/0617 |
| 10,042,579 B1* | 8/2018 | Natanzon ............ G06F 11/2069 |
| 10,409,493 B1* | 9/2019 | Kucherov ............. G06F 3/0653 |
| 10,664,358 B1* | 5/2020 | Chen ..................... G06F 3/0619 |

(Continued)

FOREIGN PATENT DOCUMENTS

| KR | 101644125 | 7/2016 |
| KR | 20180030319 A | 3/2018 |

(Continued)

OTHER PUBLICATIONS

"International Application Serial No. PCT/US2021/056855, International Preliminary Report on Patentability mailed May 11, 2023", 6 pgs.

(Continued)

*Primary Examiner* — Than Nguyen
(74) *Attorney, Agent, or Firm* — Schwegman Lundberg & Woessner, P.A.

(57) ABSTRACT

Disclosed in some examples are methods, systems, computing devices, and machine-readable mediums in which the system maintains a list of resources available for each rollback session. In some examples, state data is kept that indicates available memory. If a write occurs for a particular session and the amount of available memory for a session has been used, a flag is set in metadata for the memory location and the write is not mirrored. In this manner, the technical problem of one undo logging session using too much memory and preventing other undo logging sessions from properly functioning is solved by the technical solution of setting resource limits for each undo logging session.

20 Claims, 11 Drawing Sheets

(56) References Cited

U.S. PATENT DOCUMENTS

| | | | |
|---|---|---|---|
| 10,990,391 B2 | 4/2021 | Brewer | |
| 10,990,392 B2 | 4/2021 | Brewer | |
| 11,321,006 B1* | 5/2022 | Grunwald | G06F 3/0688 |
| 2008/0270708 A1 | 10/2008 | Warner et al. | |
| 2011/0302136 A1 | 12/2011 | Lakshminath et al. | |
| 2012/0079177 A1 | 3/2012 | Brewer et al. | |
| 2012/0158680 A1 | 6/2012 | Shaughnessy | |
| 2013/0138892 A1 | 5/2013 | Loh et al. | |
| 2013/0332711 A1 | 12/2013 | Leidel et al. | |
| 2014/0082322 A1 | 3/2014 | Loh et al. | |
| 2014/0258660 A1 | 9/2014 | Cheriton | |
| 2015/0143350 A1 | 5/2015 | Brewer | |
| 2015/0206561 A1 | 7/2015 | Brewer et al. | |
| 2016/0077922 A1 | 3/2016 | Yoon et al. | |
| 2016/0085585 A1 | 3/2016 | Chen et al. | |
| 2016/0147786 A1* | 5/2016 | Andrei | G06F 16/2358 |
| | | | 707/695 |
| 2016/0328153 A1 | 11/2016 | Krause | |
| 2017/0185294 A1 | 6/2017 | Moon et al. | |
| 2018/0074748 A1 | 3/2018 | Makin et al. | |
| 2018/0253468 A1* | 9/2018 | Gurajada | G06F 16/2255 |
| 2018/0260324 A1* | 9/2018 | Marathe | G06F 12/0804 |
| 2019/0042214 A1 | 2/2019 | Brewer | |
| 2019/0171604 A1 | 6/2019 | Brewer | |
| 2019/0205244 A1 | 7/2019 | Smith | |
| 2019/0243700 A1 | 8/2019 | Brewer | |
| 2019/0303154 A1 | 10/2019 | Brewer | |
| 2019/0324928 A1 | 10/2019 | Brewer | |
| 2019/0340019 A1 | 11/2019 | Brewer | |
| 2019/0340020 A1 | 11/2019 | Brewer | |
| 2019/0340023 A1 | 11/2019 | Brewer | |
| 2019/0340024 A1 | 11/2019 | Brewer | |
| 2019/0340027 A1 | 11/2019 | Brewer | |
| 2019/0340035 A1 | 11/2019 | Brewer | |
| 2019/0340154 A1 | 11/2019 | Brewer | |
| 2019/0340155 A1 | 11/2019 | Brewer | |
| 2020/0026698 A1 | 1/2020 | Benke et al. | |
| 2020/0257672 A1 | 8/2020 | Lee et al. | |
| 2020/0319980 A1 | 10/2020 | Marathe et al. | |
| 2020/0372163 A1* | 11/2020 | Chung | H04L 9/14 |
| 2021/0055964 A1 | 2/2021 | Brewer | |
| 2021/0064374 A1 | 3/2021 | Brewer | |
| 2021/0064435 A1 | 3/2021 | Brewer | |
| 2021/0149600 A1 | 5/2021 | Brewer | |
| 2021/0365092 A1 | 11/2021 | Ruppel et al. | |
| 2022/0019366 A1* | 1/2022 | Freilich | G06F 21/6218 |
| 2022/0103622 A1* | 3/2022 | Camargos | G06F 11/301 |
| 2022/0129196 A1 | 4/2022 | Roberts et al. | |
| 2023/0060587 A1 | 3/2023 | Brewer et al. | |
| 2023/0137525 A1* | 5/2023 | Karr | H04L 67/1097 |
| | | | 711/162 |

FOREIGN PATENT DOCUMENTS

| | | |
|---|---|---|
| KR | 20190113359 A | 10/2019 |
| WO | 2010051167 | 5/2010 |
| WO | 2013184380 | 12/2013 |
| WO | 2019191740 | 10/2019 |
| WO | 2019191742 | 10/2019 |
| WO | 2019191744 | 10/2019 |
| WO | 2019217287 | 11/2019 |
| WO | 2019217295 | 11/2019 |
| WO | 2019217324 | 11/2019 |
| WO | 2019217326 | 11/2019 |
| WO | 2019217329 | 11/2019 |
| WO | 2019089816 | 4/2020 |
| WO | WO-2022093961 A1 | 5/2022 |
| WO | WO-2023018470 A1 | 2/2023 |

OTHER PUBLICATIONS

"International Application Serial No. PCT/US2021/056855, International Search Report mailed Feb. 10, 2022", 3 pgs.

"International Application Serial No. PCT/US2021/056855, Written Opinion mailed Feb. 10, 2022", 5 pgs.

"International Application Serial No. PCT/US2022/032812, International Search Report mailed Sep. 23, 2022", 3 pgs.

"International Application Serial No. PCT/US2022/032812, Written Opinion mailed Sep. 23, 2022", 4 pgs.

Chou, Chiachen, et al., "CAMEO:A Two-Level Memory Organization with Capacity of Main Memory and Flexibility of Hardware-Managed Cache", 2014 47th Annual IEEE/ACM International Symposium on Microarchitecture, (2014), 12 pgs.

Dong, X, et al., "Leveraging 3D PCRAM technologies to reduce checkpoint overhead for future exascale systems", Proceedings of the Conference on High Performance Computing Networking, Storage and Analysis, (2009), 13 pgs.

Leis, V, et al., "Exploiting hardware transactional memory in main-memory databases", IEEE 30th International Conference on Data Engineering, (2014), 12 pgs.

Seshadri, Vivek, et al., "RowClone: Fast and Energy-Efficient In-DRAM Bulk Data Copy and Initialization", 2013 46th Annual IEEE/ACM International Symposium on Microarchitecture (MICRO), (2013), 13 pgs.

U.S. Appl. No. 17/836,529, filed Jun. 9, 2022, Undo Capability for Memory Devices.

"International Application Serial No. PCT US2023 012621, International Search Report mailed Jun. 16, 2023", 3 pages.

"International Application Serial No. PCT US2023 012621, Written Opinion mailed Jun. 16, 2023", 3 pages.

* cited by examiner

FINE GRAINED RESOURCE MANAGEMENT FOR ROLLBACK MEMORY OPERATIONS

GOVERNMENT RIGHTS

This invention was made with U.S. Government support under Agreement No. DE-AC05-76RL01830, awarded by the Pacific Northwest National Laboratory. The U.S. Government has certain rights in the invention.

TECHNICAL FIELD

Embodiments pertain to memory devices. Some embodiments pertain to reverting to a previous data value stored in a memory device upon abortion of an operation or a failure of the memory device or application. Some other embodiments pertain to providing multiple different rollback sessions that may be individually controlled. Still other embodiments pertain to managing allocations of resources across those different sessions.

BACKGROUND

Memory devices for computers or other electronic devices may be categorized as volatile and non-volatile memory. Volatile memory requires power to maintain its data, and includes random-access memory (RAM), dynamic random-access memory (DRAM), or synchronous dynamic random-access memory (SDRAM), among others. Non-volatile memory can retain stored data when not powered, and includes flash memory, read-only memory (ROM), electrically erasable programmable ROM (EEPROM), static RAM (SRAM), erasable programmable ROM (EPROM), resistance variable memory, phase-change memory, storage class memory, resistive random-access memory (RRAM), and magnetoresistive random-access memory (MRAM), among others. Persistent memory is a type of non-volatile memory that is characterized as byte addressable low latency memory. Examples of persistent memory may include Non-volatile Dynamic Inline Memory Modules (NVDIMM), phase-change memory, storage class memory, and the like.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
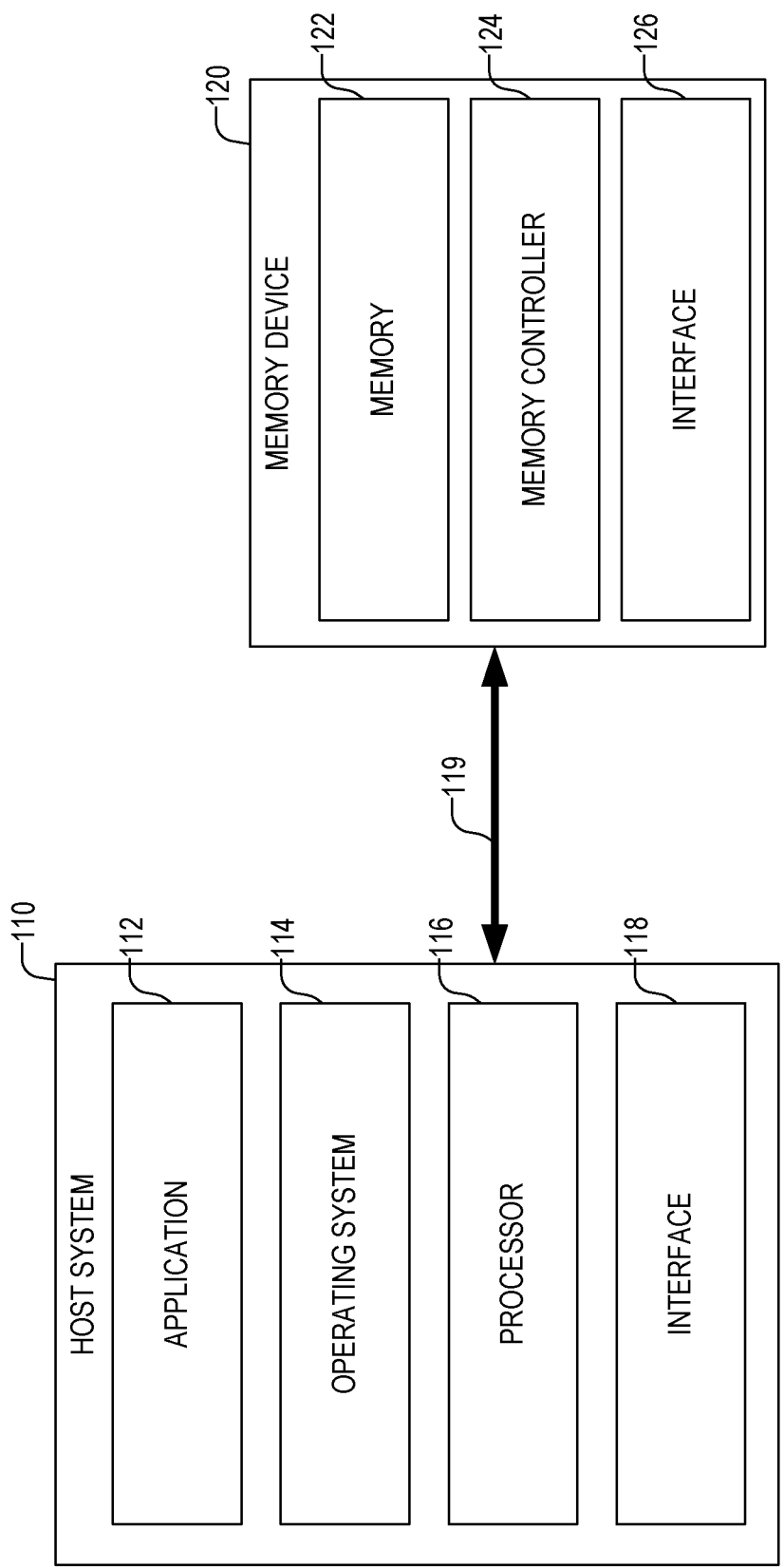
FIG. 1 illustrates an operating environment of a memory device according to some examples of the present disclosure.

The confluence of several factors such as an increase in speed (and decrease in latency) of memory devices such as storage class memory devices and other persistent memory devices in combination with their non-volatile properties; the increase in speed of computer busses (such as the Peripheral Component Interconnect Express (PCIe)); and other factors have led to the realization that such memory devices may be used more directly by other components of the host computer system. For example, Compute Express Links (CXL) may allow storage of the memory device to be shared across multiple components. For example, a storage class memory device may be used by the CPU in a manner similar to how a CPU uses RAM. CXL enables these usages through the PCIe physical and electrical interface with new protocols that allow memory and cache coherence between components.

These and other use cases of persistent memory create new challenges for applications executing on these systems. For example, in the past memory operations were completed in volatile RAM and then flushed to the non-volatile storage upon completion. This provided a method of performing computations in memory and only saving the resultant value when such calculations were successful or otherwise met defined criteria. The use of non-volatile storage means that intermediate values may be stored to non-volatile storage at any point. As such, a power outage or other failure in mid-memory operation creates the possibility that the data stored in storage is in an intermediate state that is not valid. Such a state is difficult to detect and difficult to recover from without significant additional instructions and additional checks.

In response to these needs, techniques have been developed that allows an application to create an undo logging session when memory operations may need to be rolled back if a crash or other failure occurs. The undo logging session starts with the application providing a list of one or more memory locations. The memory state of those locations is saved until the application thread indicates that the undo logging session is complete, and the memory modifications should be committed, or that the memory modifications should be discarded. During the undo logging session, memory writes to a particular memory location in the list of one or more memory locations provided by the application are performed on a copy of the value and the original value is preserved. If the undo logging session is committed, then the copy becomes the correct value and may then be subsequently used in place of the original, or the value stored in the copy is copied to the original. If the undo logging session is abandoned, the copy is not preserved, and the value goes back to the original.

Memory blocks allocated for the undo logging session may be reclaimed after the operation is either committed or aborted. The amount of memory allocated for the undo logging session may be related to the amount of memory modified, not the number of modifications. Thus, a single block that is modified, independent of the number of times it is modified, requires a single block to hold the original memory value and a block to hold the current value. The disclosed methods thus have relatively low resource overhead. This contrasts with some solutions which may log each modification which may quickly use up a significant amount of memory resources. In addition, the time to start and complete an operation is proportional to the amount of memory used by the operation. In some examples, the memory for undo logging purposes is allocated to a process rather than from a system wide pool to prevent denial of service attacks that are inadvertent or intentional. The present disclosure thus solves the technical problem of data integrity for persistent memory devices by utilizing the technical solution of an undo logging session that saves memory state from before the undo logging session and uses metadata to control the undo logging session.

In some examples, it may be desirable to have finer-grained control over what values are committed and what values are rolled back. For example, to have multiple different sessions that may be independently committed or undone. In some examples, the system may provide multiple undo logging sessions that may be ongoing simultaneously. Each undo logging session may correspond to a different set of one or more memory locations. Operations to undo or commit a first logging session are independent of a second logging session. That is, if a first logging session is rolled back, a second logging session may be committed. Because memory resources for storing the changed values within an undo logging session may be limited, problems may arise when one undo logging session uses up more than its fair share of resources. This can lead to failures in other undo logging sessions. This may be a bigger problem with multi-process and multi-processor environments where the memory serves many different processes executing on different processors.

Disclosed in some examples are methods, systems, computing devices, and machine-readable mediums in which the system maintains a list of resources available for each rollback session. In some examples, state data is kept that indicates available memory. If a write occurs for a particular session that triggers allocation of a mirror block and the amount of available memory for a session has been used, an error flag is set in metadata for the memory location, a mirror block is not allocated, and the write is serviced using the original block. In this manner, the technical problem of one undo logging session using too much memory and preventing other undo logging sessions from properly functioning is solved by the technical solution of setting resource limits for each undo logging session.

Figure 11:
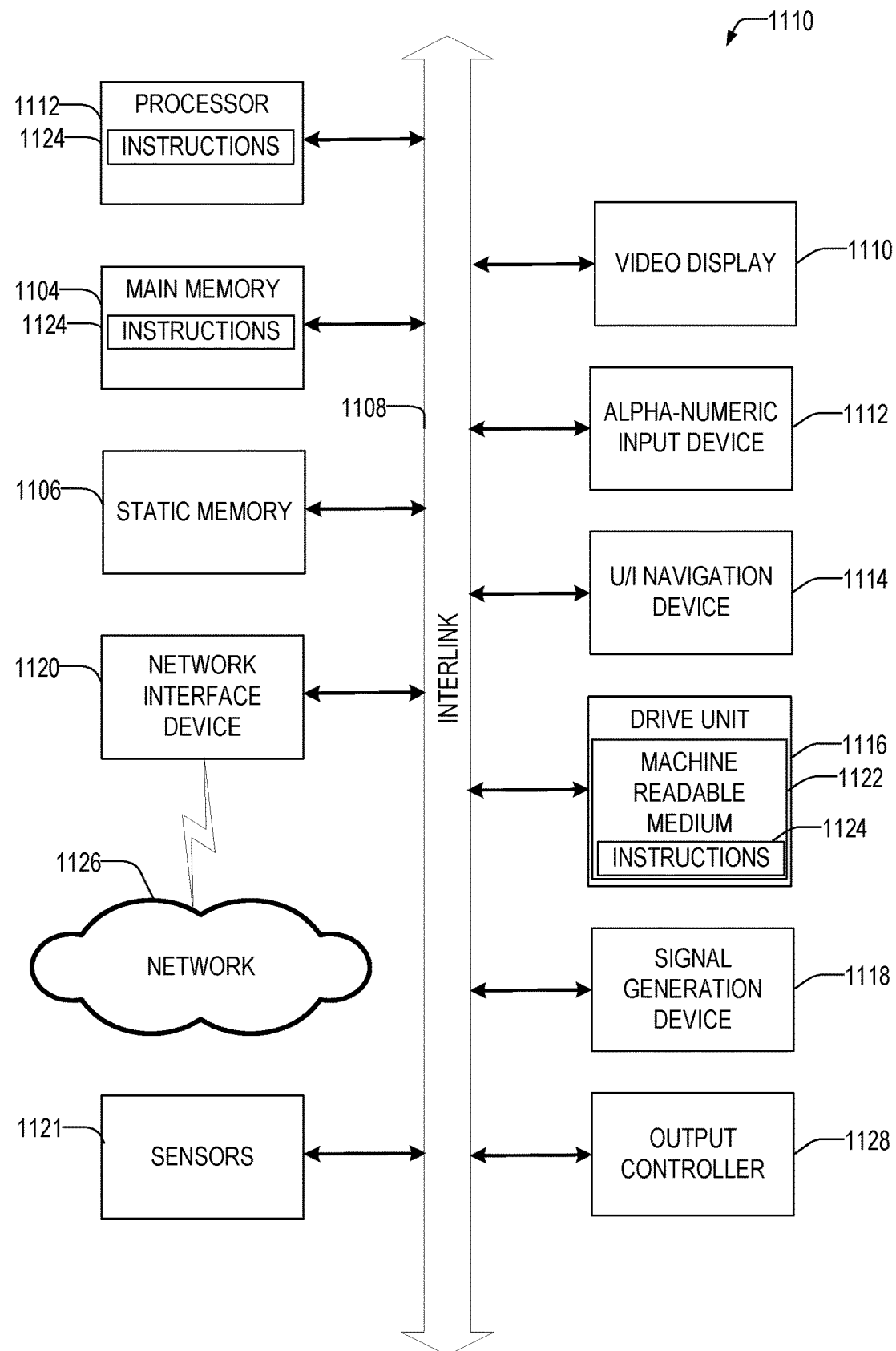
FIG. 11 is a block diagram illustrating an example of a machine upon which one or more embodiments may be implemented.

FIG. 1 illustrates an operating environment of a memory device 120 according to some examples of the present disclosure. Host system 110 may comprise, include components of, or be integrated into, a computing device, such as shown in FIG. 11. In some examples, the host system 110 may include a processor 116 (which may be an example of processor 1102 of FIG. 11). The processor 116 may include one or more caches, such as L1, L2, and/or L3 cache. Operating system 114 may execute on the processor 116 and may provide one or more application programming interfaces (APIs) for applications, such as application 112 to interface with the hardware of the system (e.g., the components of FIG. 11). Application 112 may perform one or more functionalities using the hardware and resources provided by the operating system 114. Interface components 118 and 126 may be or manage a physical interface 119 and may include one or more software and/or protocol implementations. Example interface components may implement a PCIe interface, a Universal Serial Bus interface, a CXL interface, and the like (e.g., the interface components 118 and 126 and physical interface 119 may be an example of an interconnect such as interlink 1108 of FIG. 11).

Memory device 120 may include memory 122, such as NAND storage, phase change memory, Random Access Memory (RAM), and the like. Memory 122 may be an example of main memory 1104, static memory 1106, or drive unit 1116. Memory controller 124 may be or include one or more processing units that may manage the memory 122 such as processor 1102 of FIG. 11. Memory controller 124 may have volatile storage for storage of data and instructions. For example, memory 1104 of FIG. 11. As an example, the memory controller 124 may include one or more logical to physical mapping tables that converts logical addresses into physical addresses on the memory 122. Other examples may include other management functions with respect to memory 122, such as garbage collection, error correction, refresh control, and the like. As noted, the host system 110 may maintain cache and/or memory coherency between the host system 110 and memory device 120.

In some examples, all memory 122 in the memory device may be used for the undo logging sessions. In other examples, only certain regions of memory that are marked as eligible may be used for the undo logging sessions. Regions that are eligible for undo logging sessions may be marked using metadata, a flag, or the like. A region may be a contiguous range of physical addresses. Regions may be assigned to an application or set of applications during the execution of those applications. For example, one or more regions may be assigned to application 112 of FIG. 1. In some examples, multiple individual memory regions may be combined to form larger pools of memory. Memory regions may then be subdivided into one or more extents. Extents may be contiguous ranges of physical addresses within a region. Extents may be combined in a list and may have gaps between them. Extents may be software-requested memory objects that may be used during operations utilizing undo logging sessions. In some examples, extents may be aligned on 64-byte (B) boundaries. Each undo logging session may have an associated list of one or more extents that are part of that session. In some examples, an extent may belong to only one session at a time.

An application (e.g., such as application 112) may create an undo logging session. For example, the application may call a function provided by an operating system (such as operating system 114 and/or provided by the memory controller 124). One example function may be of the form UndoLogging_start(vector of Extents). This function may return an operation identifier (undoID) that may be a unique session identifier that identifies the undo logging session. Upon calling the UndoLogging_start function, the system may validate that each of the extents passed in with the function is within a region where the undo logging feature is enabled (e.g., through a flag or other attribute associated with a memory region). In addition, the system may flush host cache lines that are in an exclusive or modified state back to the memory device for each extent in a newly created undo logging session. For example, CXL devices may allow the processor (e.g., processor 116) to exercise control over one or more memory locations of memory (e.g., memory 122). In this state, the value stored in the memory device may not be up to date (e.g., a cached value may be more recent). By flushing the cache, all updates made by the processor may be flushed back to the memory. Once complete, flushing the cache establishes a consistent starting snapshot for a recovery operation if necessary. In addition, the system may initialize bit fields for the extents that track the state of each memory line. Finally, the system may write a list of extents to persistent memory for crash cleanups.

Figure 2:
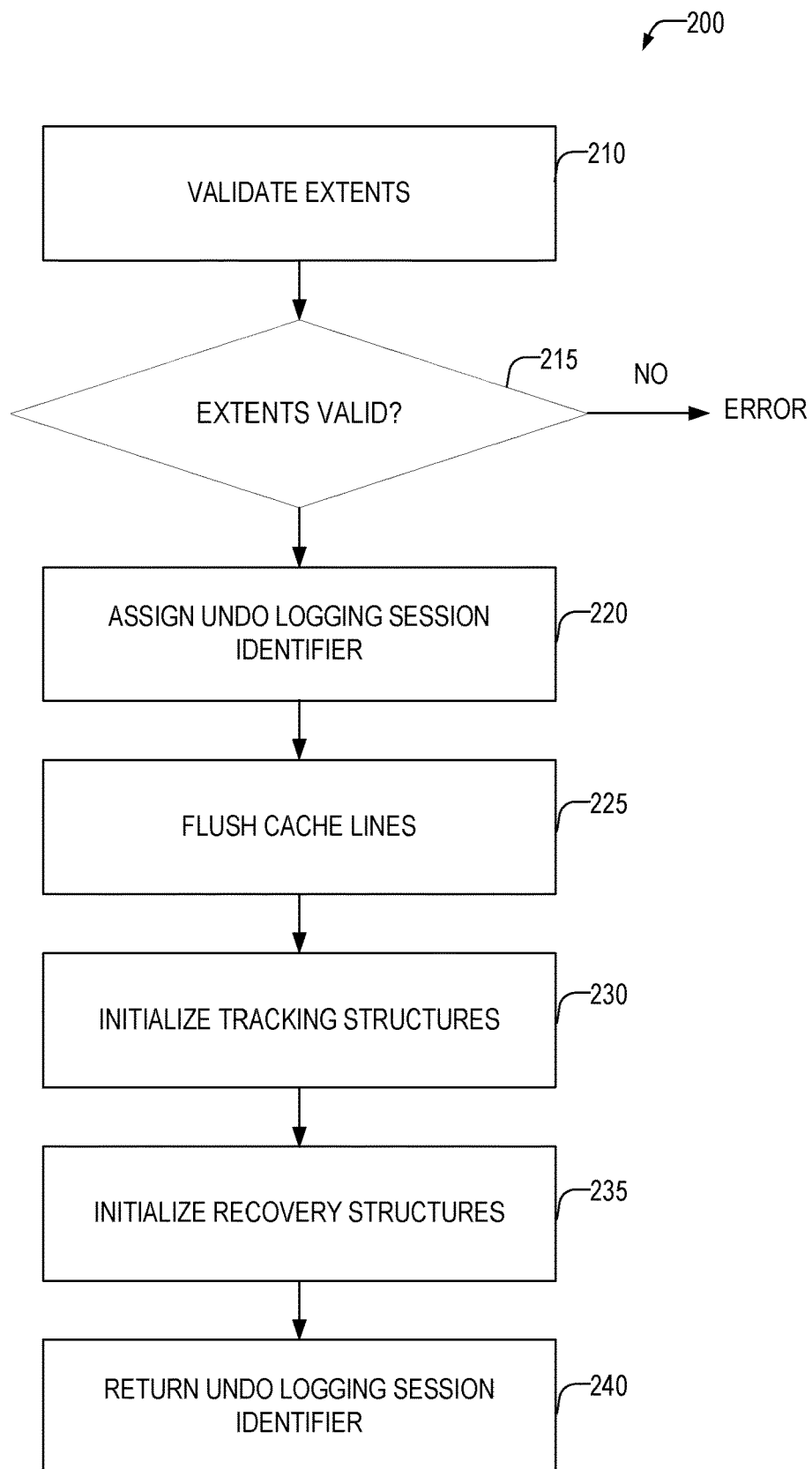
FIG. 2 illustrates a flowchart of a method of initializing an undo logging session according to some examples of the present disclosure.

FIG. 2 illustrates a flowchart of a method 200 of initializing an undo logging session according to some examples of the present disclosure. The method 200 may be performed by an operating system of a host, a controller of the memory device, portions may be performed by the host and other portions may be performed by the controller of the memory device, or the like. At operation 210 the system may validate the extents requested for the undo logging session. For example, the method 200 may be started using a function call to an API called by an application executing on the host. The function call may include or otherwise specify one or more extents. The extents may be validated to ensure they are within memory regions that are configured to support undo logging sessions and to ensure they are not already part of an existing session. If, at operation 215, one or more of the extents are not valid, then the system returns an error. If the extents are valid, then at operation 220, an undo logging session identifier is assigned this identifier may be a unique identifier. The identifier may be unique to the whole system (including the host and other memory devices) or may be unique to the memory device.

At operation 225, for each memory line that is associated with the extents passed in with the function call that is currently indicated as in an exclusive or modified state (e.g., a CXL device), the memory line is flushed. In some examples, this flush may be achieved using CXL coherency commands or host software instructions. This operation ensures that the memory device has updated and valid memory at the start of the undo command.

At operation 230, the tracking structures may be initialized. These include metadata and memory block points and are described in more detail with respect to FIGS. 3 and 4. The initialization of these may be described more in FIG. 3. At operation 235, recovery structures may be initialized. These structures are used in the event of a power or other failure to undo all currently pending undo logging sessions that have not been committed. These structures are described in more detail with respect to FIG. 8.

At operation 240, the call may return the undo logging session identifier to the calling party (e.g., the application). The undo logging session identifier may be used to reference this particular operation in later function calls or commands. For example, the system may allow an application to add extents to an operation by supplying additional extents and the undo logging session identifier. In these examples, the system may validate the additional extents, flush the cache lines of the added extents, initialize tracking structures for the added extents, and add the extents to the recovery structures as described for the creation of the undo logging session.

In some examples, in addition to the checks shown in FIG. 2, the system may check to ensure that the extents are not already part of a different undo logging session. In some examples, each extent may be limited to a single undo logging session. Note that during operation 230, the metadata for each extent in the session may be updated to reflect the extent's participation in the session (e.g., by setting the appropriate session id). In some examples, if a different memory location corresponding to the metadata structure (as each metadata structure services multiple memory locations) is already involved in a different undo logging session, the metadata may be updated to reflect that the memory tracked by the metadata structure is involved in multiple sessions.

As noted, the system uses various tracking structures and initializes them (e.g., operation 230 of FIG. 2) during the creation of the undo logging session. For example, each memory line of an extent involved in an undo logging session may have 5 bits of associated metadata. For example:

T (Tracking) bit—Indicates that memory line is currently participating in an undo logging session.
W (Writeable) bit—Tracks if the memory line is in host cache in writeable state
F (First Write) bit—Tracks if a line has been written since the undo logging session began
S (Select) bit—Records the starting (original) location for the line at the beginning of the operation. If a Mirror block (block B) had previously been allocated for a data block (block A), after an operation completes, the F bit can be cleared, and the original memory line can be left where it was to minimize data movement. The S bit identifies where the original "backup" copy of data resides, and cache line writes get redirected to the opposite block.
E (Error) bit—Records if the block pool was exhausted when writing a line. A read must return error (e.g., returns a CXL poison indication) to a requestor when this bit is set.

Furthermore, as noted, during an undo logging session, each logical block of memory may have two associated physical memory blocks. One physical block holds the original value at the start of the undo logging session and is used if the undo logging session is rolled back in the case of failure or explicit operation abort (e.g., through a function call to abort). The other block is initialized to the value of the first physical block and stores changes made to the memory during the undo logging session. This block stores the value to use if the undo logging session is committed. As noted above, the select bit of the metadata indicates which block is the original value and which is the value as updated by memory operations during the undo logging session. This allows for more efficient commits or rollbacks as the system just flips the bit to indicate which block is a valid value. That is, if the first block stores the initial state and the second block stores the state as the result of the memory operations performed while the undo logging session is running—if the undo logging session is committed, then the select bit will point to the second block. If, on the other hand, the application performs a rollback of the undo logging session, then the select bit will point to the first block. Subsequent operations (whether within an undo logging session or not) will be performed on the block indicated by the select bit.

The following table illustrates a memory line sequence and example values of each of the TWFSE bits that are set in response to various example memory operations. Note that the select bit is either a one or a zero depending on the result of a previous undo logging session. If this is a first undo logging session for a block in which this memory line is a part of, then this is likely to be initialized to a default value (either zero or one).

| T | W | F | S | E | Memory Operation | Description |
|---|---|---|---|---|---|---|
| 0 | X | 0 | X | 0 | — | Initial state prior to undo logging session |
| 1 | 0 | 0 | X | 0 | UndoLogging_startc | State after operation start is performed (Tracking, line recalled if, needed, clean A or B block present, no error) |
| 1 | 1 | 0 | X | 0 | Mem Read | Line accessed by Host for Write (host now has line in exclusive state) |
| 1 | 0 | 0 | X | 0 | — | Line evicted from Host without modification |
| 1 | 1 | 0 | X | 0 | Mem Read | Line Accessed by Host for Write |
| 1 | 0 | 1 | X̲ | 0 | Mem Write | Line written back by Host (Second block allocated, S bit is complemented)* |
| 1 | 1 | 1 | X | 0 | Mem Read | Line Access by Host for Write |
| 1 | 0 | 1 | X̄ | 0 | Mem Write | Line Evicted (with or without modification) |

*Note
that, at first write, if the system does not have enough blocks to allocate the second block, the TWFSE will set the error bit (E) to 1.

Figure 3:
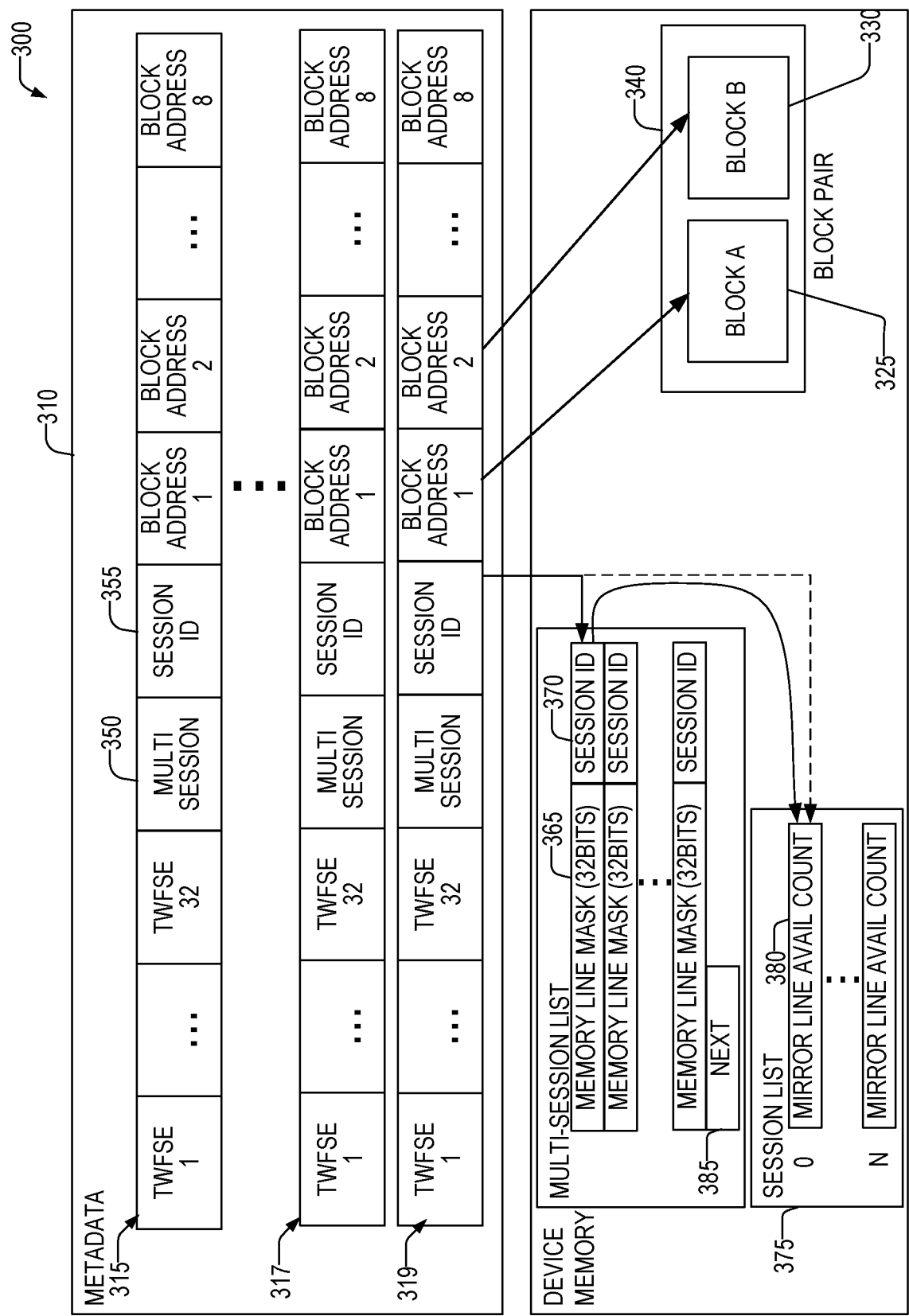
FIG. 3 illustrates a diagram of the metadata and the physical memory according to some examples of the present disclosure.
Figure 4:
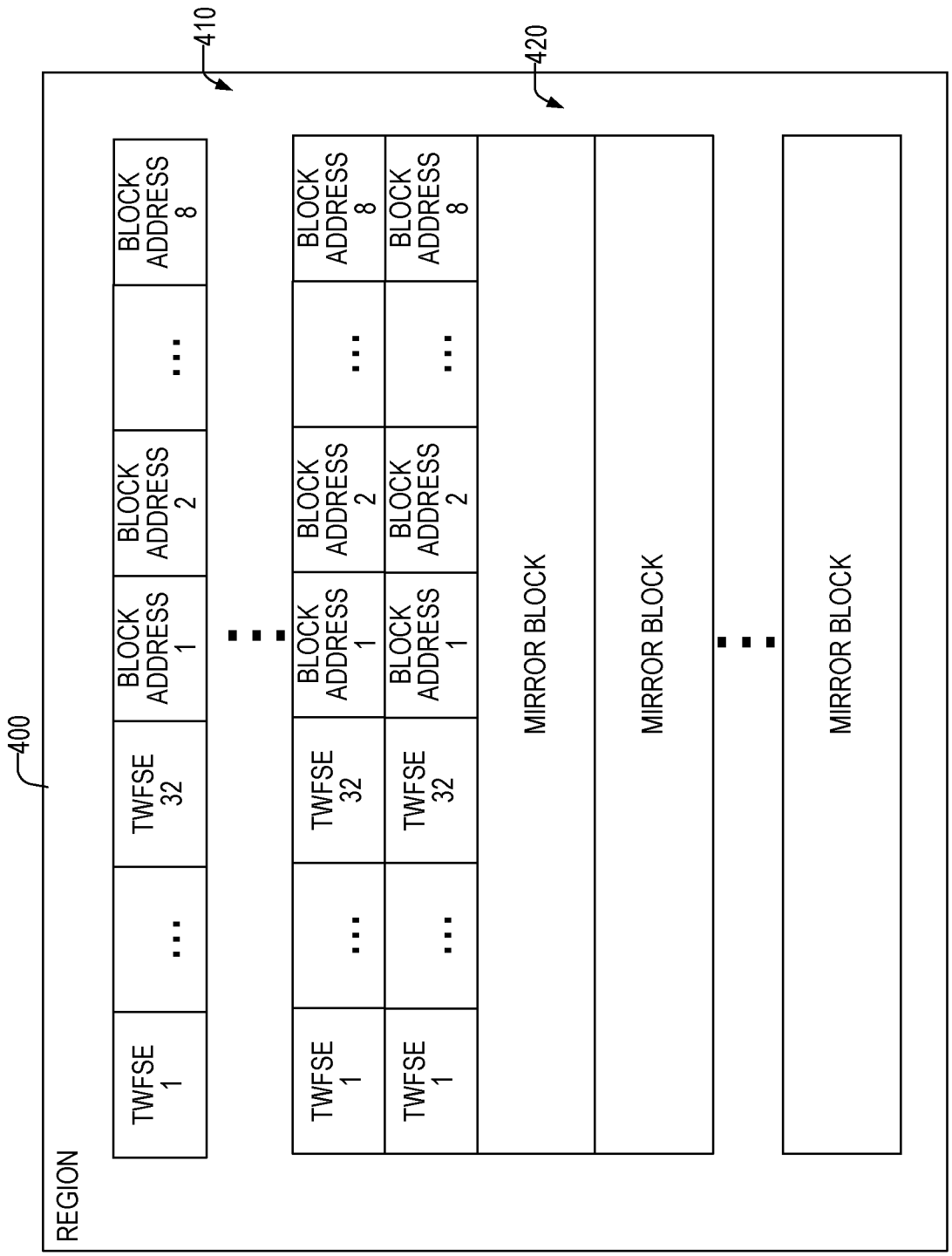
FIG. 4 illustrates the format of the region of memory according to some examples of the present disclosure.

FIG. 3 illustrates a diagram 300 of the metadata 310 and the physical memory 340 according to some examples of the present disclosure. Metadata data structures 315, 317, and 319 store state information for undo logging sessions. In the example of FIG. 3, each of the metadata data structures 315, 317, and 319 store metadata information for four 512B blocks of memory. Included in the metadata data structures 315, 317, and 319 are TWFSE metadata fields. In some examples, separate TWFSE metadata fields may be stored for each memory line of each block. If a memory line is 64B and a block is 512B then there are eight TWFSE metadata fields per block. As noted, in the Example of FIG. 3, each metadata data structure 315, 317, and 319 stores metadata for 4 blocks. Thus, there are 32 TWFSE fields (512B per block/64B per line=8*4 blocks per metadata structure) and 8 block address pointers (2 block address pointers per block*4 blocks) per metadata data structure 315, 317, and 319. Each pair of block address pointers corresponds to a block. Thus, a first memory block may have two address pointers to physical addresses of one or more memory blocks in the physical memory 340. For example, physical addresses of blocks 325 and 330. Blocks 325 and 330 form a block pair in which one block may be used to store values prior to the undo logging session and the other block may store the values that result from memory operations executed during the undo logging session. As noted, the select bit in the TWFSE field may determine which of the blocks is used to store values prior to the undo logging operation and which block may store the values that result from the memory operations undertaken during the undo logging session. FIG. 4 illustrates the format of the region of memory 400. The lower address range of the region 420 may be used as memory blocks and the upper region 410 for metadata.

As previously noted, the multi-session flag 350 in the metadata structure may indicate if the memory lines corresponding to the metadata data structure are involved in a same session, or if one or more memory lines are in one session and one or more other memory lines are in a different session. If the multi-session flag 350 is false, then the session ID field 355 stores the undo logging session id of the one or more memory locations serviced by the metadata structure that are part of the session. The session id may be an index into a session list 375. The session list at the session index may store the mirror line availability counter 380. This field tracks the amount of allocated mirror blocks that are available for that particular session. Each time a mirror block is allocated, this value may be decremented. If this value is zero, additional attempts to allocate mirror blocks will fail and the "E" bit of the TWFSE metadata is set to indicate an error. Upon de-allocating a mirror block, the value of the mirror line availability counter may be incremented.

If the multi-session flag 350 is set, this indicates that different memory lines tracked by the metadata structure may be in different sessions. In this case, the session id field 355 may index or point into a multi-session list. Each entry in the list has a memory line mask with 32 bits and a session ID. The next pointer 385 may point to the next entry in the list. The session ID for each line indexes into the session list 375, which gives the mirror line availability counter 380. The memory line mask 365 has a single bit for each of the 32 memory lines serviced by a metadata structure (e.g., metadata data structure 315, 317, or 319). One value of the bit (e.g., '1') indicates that the memory line is part of the undo logging session indicated by the session id 370. One value of the bit (e.g., '0') indicates that the memory line is not part of the undo logging session indicated by the session id 370. In some examples, there are as many memory line mask 365 and session id 370 pairs in each multi-session list item as there are maximum supported simultaneous sessions for a metadata structure. In other examples, there are a fixed number of memory line mask 365 and session id 370 pairs in each multi-session list item. Since a metadata structure could have lines participating in more than the fixed number of simultaneous sessions, the next pointer 385 may then point to the next multi-session list entry comprising sets of memory line masks and session ids for the same metadata structure.

When initiating a new undo logging session at operation 230, the system may iterate through the metadata data structures (e.g., 315, 317, and 319) of each memory location within the new undo logging session. For each particular metadata state structure:

a If no active undo logging session currently exists (i.e., all T flags are cleared in the TWFSE fields of the particular metadata structure), then the multi-session is set to false, and the Session ID is assigned the appropriate Session List entry index.

b If at least one T flag bit is set in the TWFSE fields of the particular metadata structure, the multi-session bit is false, and the new session ID matches the existing session ID then the multi-session bit and Session ID fields are not modified (the T flags are set for the new extent).

c If at least one T flag bit is set in the TWFSE fields of the particular metadata structure, the multi-session bit is false, and the new session ID does not match the Session ID field in the particular metadata structure then a new multi-session list entry is allocated. The existing session info is entered into the multi-session list entry. The memory line mask is set to match the meta state T flags and the Session ID is assigned the Session ID within the particular metadata structure. The multi-session bit is set to true and the session ID field is set to the multi-session entry index. The new extent information is entered into the multi-session entry using the next paired fields (memory line mask and Session ID).

d If the multi-session bit is true, then the system determines if the session ID is already present in the multi-session list. In this case, bits are set in the mask paired with the session ID to indicate which memory lines serviced by the metadata are participating in that session.

e If the multi-session bit is true, and the system determines that the session ID is not already present in the multi-session list, the session info is entered into the multi-session list. If the existing multi-session entry does not have a free memory line mask/Session ID entry, then a new multi-session entry is allocated and linked to the first entry using the next field. Note a multi-session list entry with the memory line mask set to zero implies an unused entry.

Figure 5:
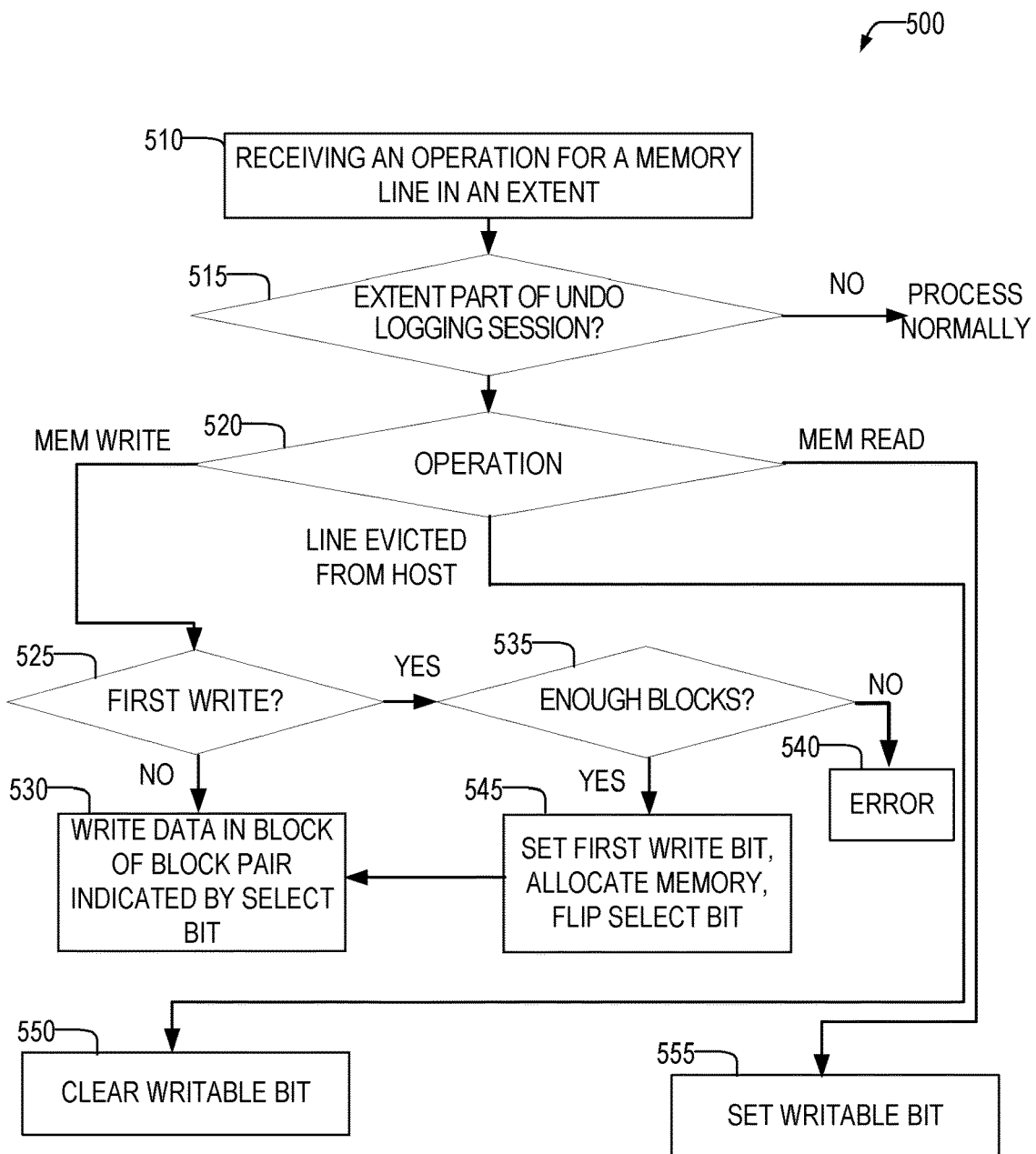
FIG. 5 illustrates a flowchart of a method of operation of the system during an undo logging session according to some examples of the present disclosure.

FIG. 5 illustrates a flowchart of a method 500 of operation of the system during an undo logging session according to some examples of the present disclosure. In some examples, the operations of FIG. 5 may be performed by a memory device, an operating system of a host, an application on the host, a combination of the aforementioned, or the like. At operation 510 the system receives an operation for a memory line of an extent. At operation 515 the system determines whether the extent is part of an undo logging session. For example, the system may determine if the "tracking" bit of the TWFSE metadata is set for one or more memory lines of the extent. If not, then the system processes the request normally. If the extent is part of an active undo logging session, then a determination is made at operation 520 what memory operation is requested. If the operation is a memory read—e.g., the line is being accessed by a host for a write, then at operation 555 the system may set the writeable bit in the TWFSE field of the metadata.

Figure 9:
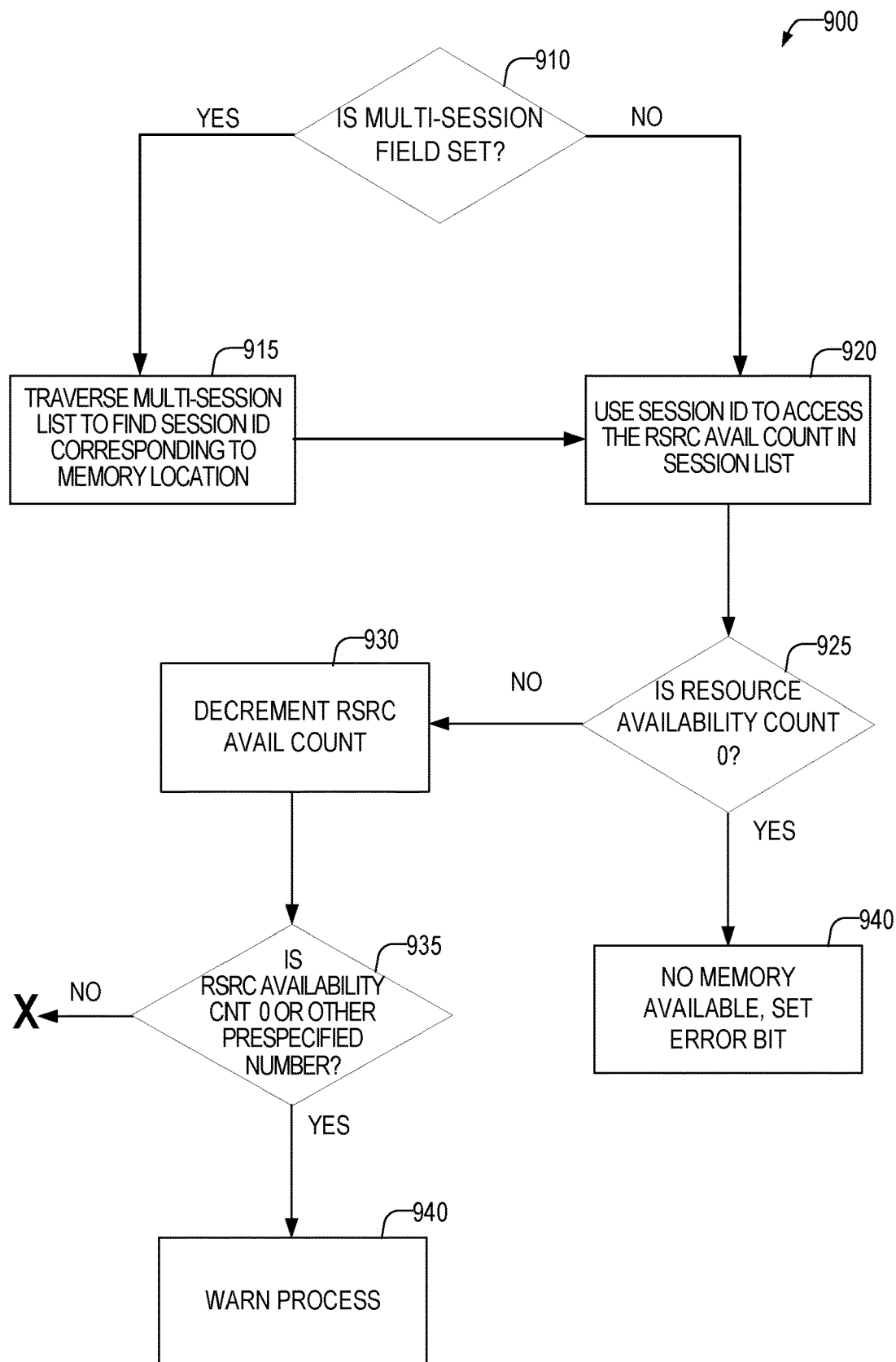
FIG. 9 illustrates a flowchart of a method for determining whether there is enough memory to allocate a mirror block according to some examples of the present disclosure.

If the line is evicted from the host without change, then at operation 550 the writeable bit is cleared. If the line is written back by the host, then at operation 525 it is determined whether the write is the first write to the memory line for the undo logging session. If the write is the first write, then at operation 535 the system determines if there is enough memory to allocate a second block to hold the changes made during the undo logging session. FIG. 9 details example operations that may be used to determine if there is enough memory to allocate. If not, then at operation 540 the system may indicate an error. For example, the system may set the error bit in the metadata and/or may raise an exception or other signal. If there are enough blocks, then at operation 545, the system may allocate another memory block, initialize the pointer in the metadata to point to the second block, set the first write bit, and flip the select bit so that new operations are performed in the newly allocated block. At operation 530, the data is written to the block of the block pair indicated by the select bit.

Figure 6:
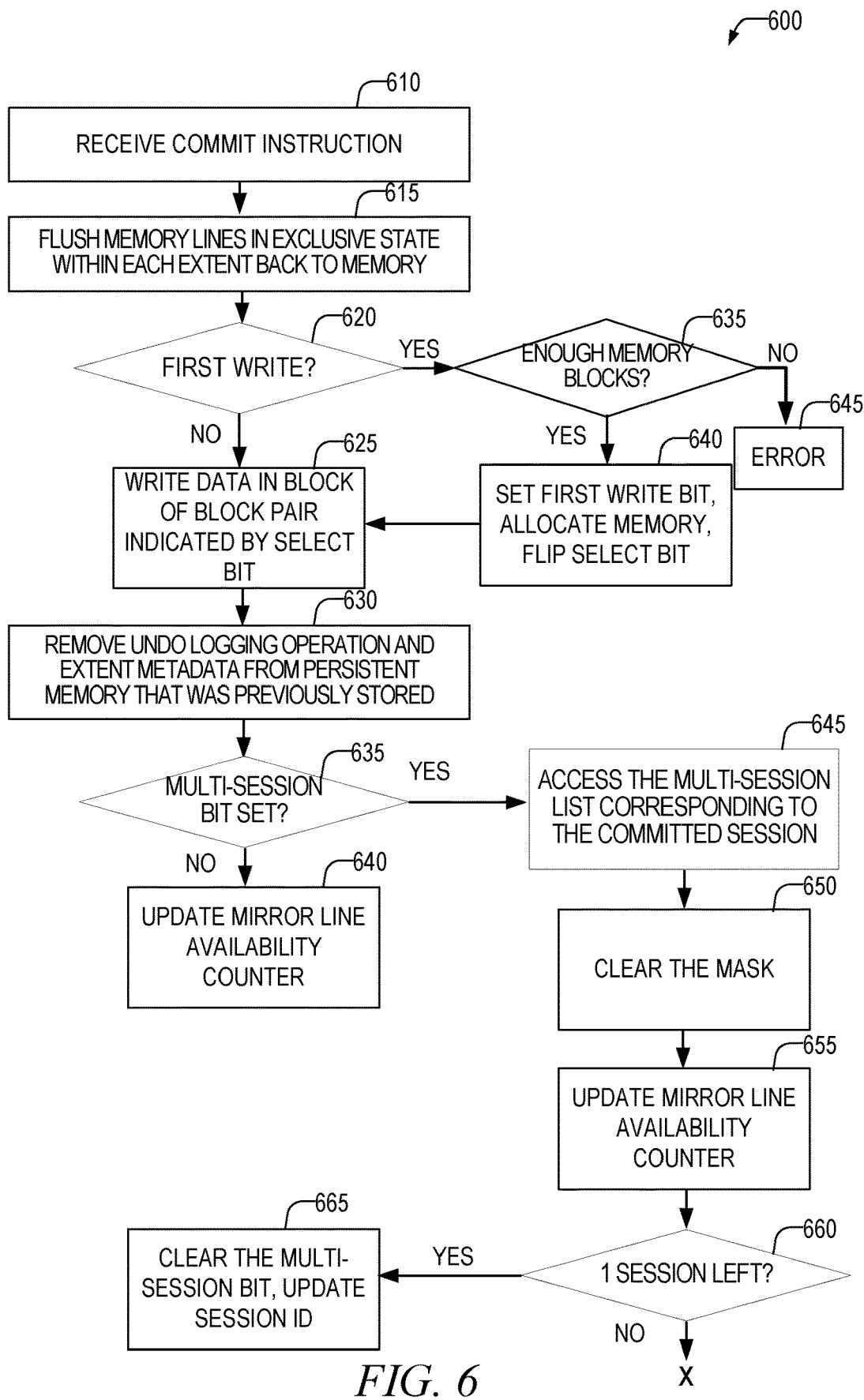
FIG. 6 illustrates a flowchart of a method of a commit instruction according to some examples of the present disclosure.

FIG. 6 illustrates a flowchart of a method 600 of a commit instruction according to some examples of the present disclosure. In some examples, the operations of FIG. 6 may be performed by a memory device, an operating system of a host, an application on the host, a combination of the aforementioned, or the like. The commit instruction causes an undo logging session to terminate, and the results of the memory operations conducted during the undo logging session are considered the appropriate value of the memory block and are committed. The backup values stored in the matched memory block may be discarded and not used. In other examples, the backup values may be logged in a log file. At operation 610 the commit instruction is received. The commit instruction may be a function call, such as UndoLogging_commit(SessionID). The calling entity passes in the undo logging session identifier.

At operation 615 the memory lines in the exclusive state for each extent associated with the undo logging session whose identifiers are specified are flushed back to memory (e.g., determined using the writeable bit of the TWFSE metadata and if the multi-session bit is set, the memory line masks). At operation 620, if the flush results in a first write to the memory line (e.g., if the memory line was previously unchanged until the flush at operation 615), then at operation 635, the system determines if there are enough memory blocks to allocate a new memory block. FIG. 9 details the operations used to determine if there is enough memory to allocate. If there are not enough memory blocks, then an error is returned at operation 645. If there are enough memory blocks, then at operation 640, the first write bit is set, the memory is allocated, and the select bit is flipped. At operation 625, the data is written to the block of the block pair indicated by the select bit. At operation 630, the system may remove the undo logging session identifier, remove the extent metadata from persistent memory. Subsequent writes to the memory line will utilize the block of the block pair pointed to by the select bit. In some examples, the other block not pointed to by the select bit may be de-allocated for use in other undo procedures.

In some examples, at operation 635, the multi-session bit for the metadata may be checked. If it is not set, then at operation 640, the mirror line availability counter may be reset to a default value. If the multi-session bit is set at operation 635, the multi-session list is accessed at 645 (e.g., using the session id in the metadata to find the multi-session list) and the mask for the corresponding session id is cleared at operation 650. At operation 655, the mirror line availability counter is reset to a default value. At operation 660, a determination is made whether there is only one session left for the memory lines associated with a particular metadata structure (e.g., metadata data structure 315, 317, and 319). If yes, then at operation 665, the multi-session bit is cleared in the metadata structure, the multi-session list is removed or set to a default value, and the session id is updated to the value of the last remaining session.

Figure 7:
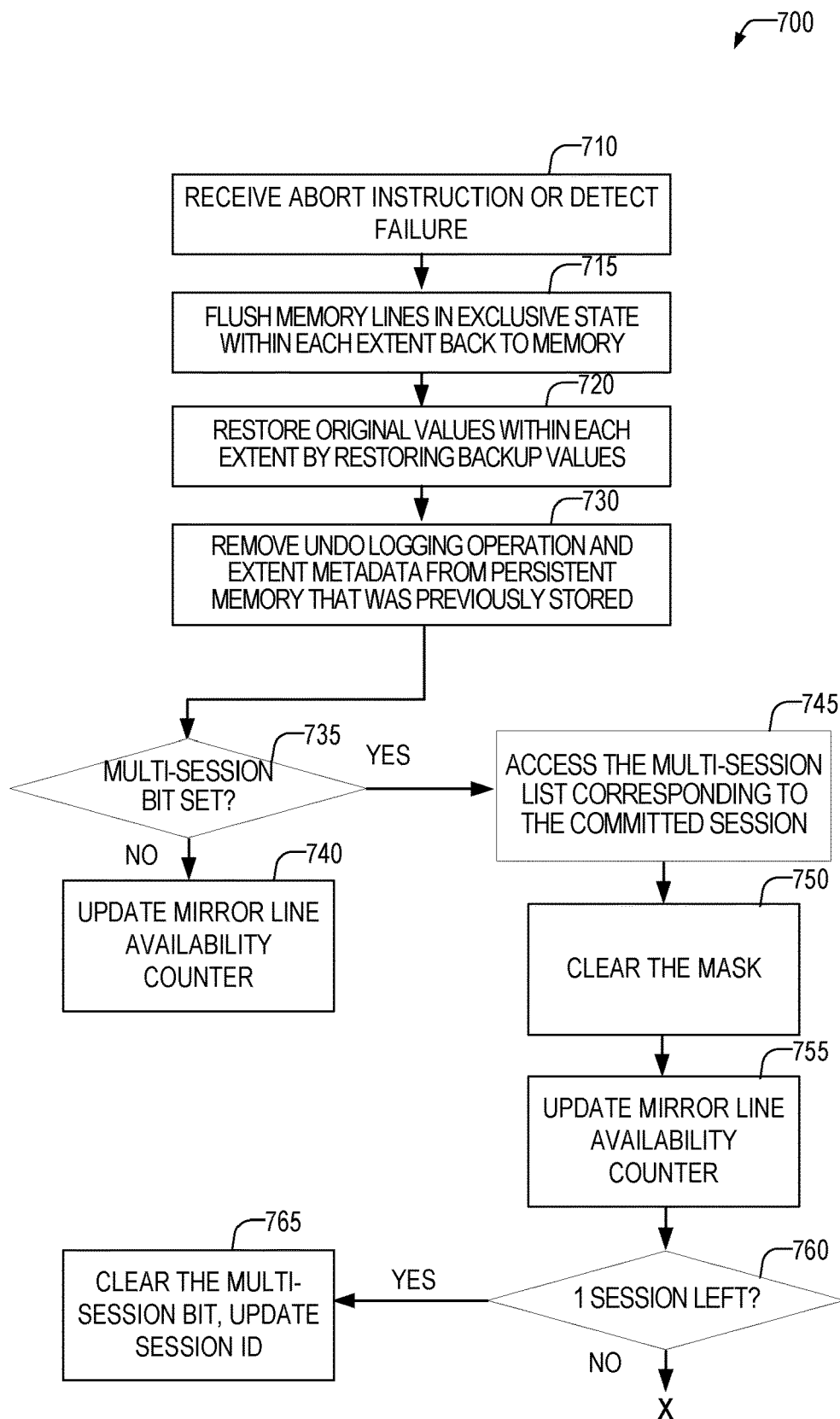
FIG. 7 illustrates a flowchart of a method of processing an abort instruction or other failure of the undo logging session according to some examples of the present disclosure.

Operations 635-665 assume that once a session is committed, the session is over. In other examples, sessions may persist across multiple intervals. That is, after an interval is over, the logging session may write the values of any changed memory lines to a particular log structure. In these examples, once writes are committed to the log, the mirror lines are then deallocated and the availability counters at operation 640 and 655 are then incremented. The session is then only cleared with operations 650, 660, and 665 when the session is terminated FIG. 7 illustrates a flowchart of a method 700 of processing an abort instruction or other failure of the undo logging session according to some examples of the present disclosure. In some examples, the operations of FIG. 7 may be performed by a memory device, an operating system of a host, an application on the host, a combination of the aforementioned, or the like. At operation 710 the system may receive an abort instruction or otherwise detect a failure. In some examples, an abort undo logging session may be initiated by a call to UndoLogging_abort(SessionID), or detection of a failure (e.g., a reset, a power loss, or the like). At operation 715, the system may flush memory lines in an exclusive state within each extent involved with the undo logging session back to memory (e.g., the memory lines may be determined using the Writeable bit of the TWFSE metadata). This may ensure that any cached writes that resulted from operations executed during the undo logging session do not change data after the undo logging session is aborted. At operation 720, the system may restore the original values within each extent by restoring the backup values. In some examples, this may include copying the values in the block of the block pair that preserved the original state to the other block. In still other examples, this may include flipping the select bit. Subsequent memory accesses may be written to the memory block indicated by the select bit. At operation 730, the system may remove the undo logging session by releasing the identifier and removing the extent metadata from persistent memory.

In some examples, at operation 735, the multi-session bit for the metadata may be checked. If it is not set, then at operation 740, the mirror line availability counter may be reset to a default value. If the multi-session bit is set at operation 735, the multi-session list is accessed at operation 745 (e.g., using the session id in the metadata to find the multi-session list) and the mask for the corresponding session id is cleared at operation 750. At operation 755, the mirror line availability counter is reset to a default value. At operation 760, a determination is made whether there is only one session left for the memory lines associated with a particular metadata structure (e.g., metadata data structure 315, 317, and 319). If yes, then at operation 765, the multi-session bit is cleared in the metadata structure, and the session id is updated to the value of the last remaining session.

Operations 735-765 assume that once a session is committed, the session is over. In other examples, sessions may persist across multiple intervals. That is, after an interval is over, the logging session may write the values of any changed memory lines to a particular log structure. In these examples, once writes are committed to the log, the mirror lines are then deallocated and the availability counter at operation 740 and 755 are then decremented. The session is then only cleared with operations 750, 760, and 765 when the session is terminated.

As noted, if the session runs out of space for allocating a block upon a first write, the application is notified using an interrupt, poison bit in a CXL response packet, or a memory-mapped status flag. The application may then decide what action to take. Example actions may include allocating more space, ending the operation, aborting the operation, or the like. In some examples, a memory operation may be executed on the original memory block rather than the mirror block.

Figure 8:
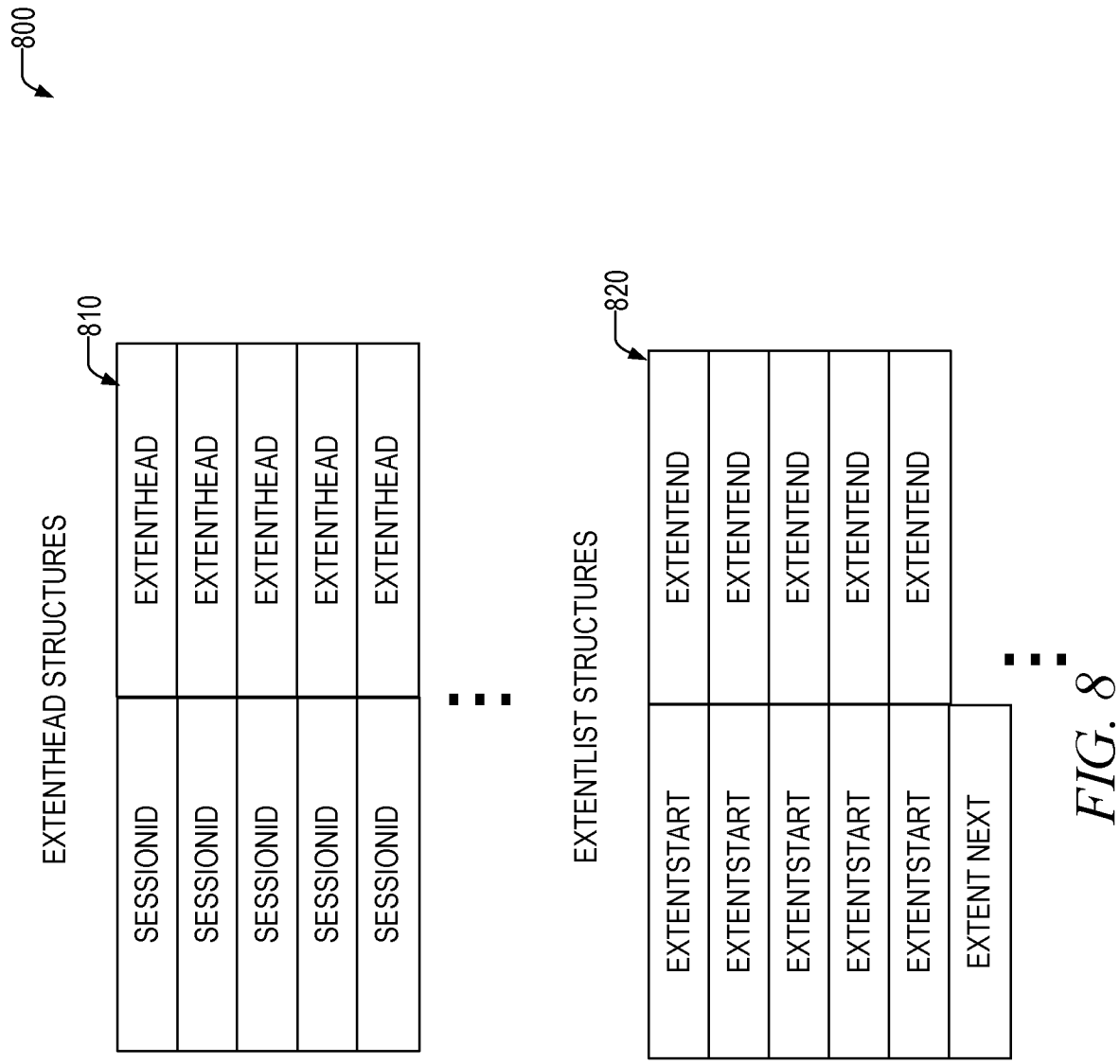
FIG. 8 illustrates an extent restore structure according to some examples of the present disclosure.

To survive power loss events, the list of Extents associated with Undo Logging IDs may be saved in persistent memory. In some examples, various data structures may be used to store this mapping. For example, FIG. 8 illustrates an Extent Restore Structure 800 according to some examples of the present disclosure. The structure has two sub-structures, ExtentHead 810 data structures and ExtentList 820 data structures. The ExtentHead 810 structure is a list of active operations needing to be restored, associating the sessionID with a pointer to the head of an ExtentList 820 structure. An ExtentList 820 is a list of extents in active operations (containing start address and end address) for a particular undo logging session. For efficiency, a 4B session id and 4B ExtentHead pointer field can be packed into 8B, allowing for an atomic swap for simplified list maintenance. For a 37-bit address offset (max. 128 GB Region size) for ExtentStart and ExtentEnd, a 64B cache line sized metadata block can store six complete extents along with a "next block" pointer called ExtentNext. An ExtentStart with all 1's may be unused, and an ExtentNext with all 1's may mark the end of the list.

FIG. 9 illustrates a flowchart of a method 900 for determining whether there is enough memory to allocate a mirror block according to some examples of the present disclosure. Method 900 may be an example of operations 535 and 635, in some examples. Method 900 may be called when a new mirror block is to be allocated to a particular memory location. At operation 910 a determination is made whether the multi-session field in the metadata corresponding to the particular memory location is set. If the multi-session field is set, then at operation 915, the multi-session list is traversed to find the session corresponding to the particular memory location. This is done by traversing each memory line mask until the bit position of the mask corresponding to the particular memory location indicates that the particular memory location is participating in an undo logging session. Once the memory line mask field is found where the corresponding bit position is set to indicate that the particular memory location is part of an undo logging session, the corresponding session id for the memory line mask is read.

Once the session id is obtained, or if the multi-session field is not set (and the session id is obtainable directly from the metadata) at operation 910, the session id is used to access the resource availability counter (e.g., the mirror line availability count) in the session list at operation 920. If the resource availability counter is zero at operation 925, then at operation 940 the error bit is set for the metadata corresponding to the particular memory location (e.g., a memory line) or some other error is generated. If the resource availability counter is not zero, then the resource availability counter is decremented at operation 930.

At operation 935, if the resource availability counter is zero after it is decremented, or if it otherwise equals some unspecified number (e.g., one, two, three or some other warning threshold) then at operation 940, the system may warn the process that initiated the undo logging session that the session memory is almost used up. This process may allocate additional memory, stop the undo logging session, or take other actions.

Figure 10:
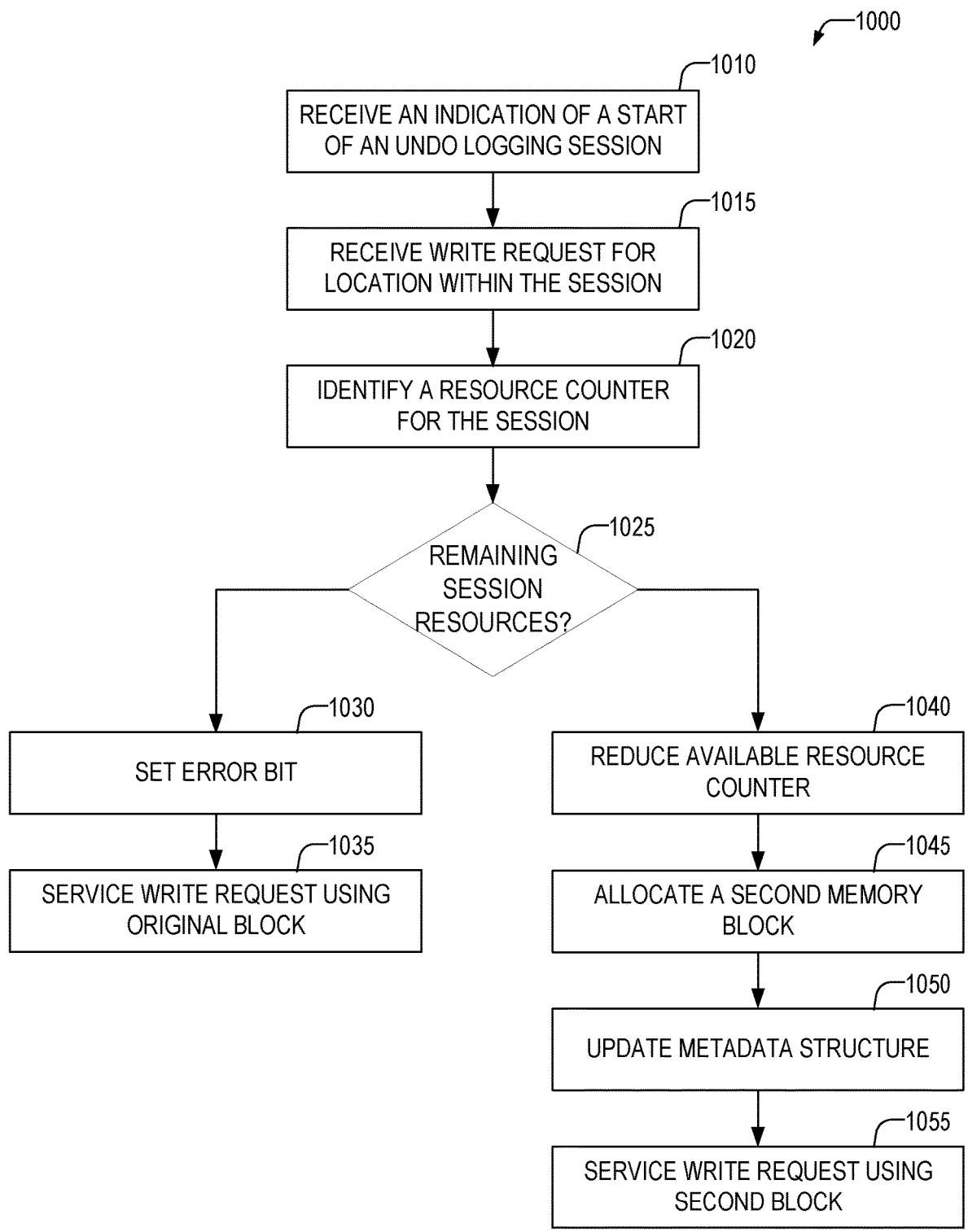
FIG. 10 illustrates a flowchart of a method of preventing an undo logging session from using too many resources according to some examples of the present disclosure.

FIG. 10 illustrates a flowchart of a method 1000 of preventing an undo logging session from using too many resources according to some examples of the present disclosure. At operation 1010 the system may receive an indication of a start of an undo logging session. In some examples, the start indication may be a message from an application on a host processor. The session may be associated with one or more memory locations (e.g., extents). The indication may provide a list of extents involved in the session. At operation 1015, the memory device may receive a write request for a memory location involved in the session—e.g., a location within one or more of the extents marked for undo logging in the session. In some examples, the first memory location may not have been written to yet during the undo logging session, and thus, would trigger allocation of a mirror block.

At operation 1020, the system may identify a resource counter for the session. For example, the metadata (such as metadata data structure 315, 317, or 319) for the memory location may be located and the multi-session field identified. If the multi session field is set to a value that indicates that memory locations serviced by that metadata are not currently part of multiple sessions, then the value of the session id field from the metadata is used to determine the session id. The session id is then used as an index to the session list (e.g., session list 375) to determine the resource counter (e.g., mirror line availability counter 380).

If, on the other hand, the multi-session field is set to a value that indicates that memory locations serviced by that metadata are currently part of multiple sessions (e.g., one memory location is part of a first session and a second memory location is part of a second session), then the session id field may be read and used as an index or pointer to a multi-session list structure. The multi-session list structure may be a set of memory line masks and corresponding session id pairs. The memory line masks may identify the memory locations involved in the corresponding session id. The system may locate the pair corresponding to the write request from operation 1015 using the memory line mask and then identify the session id value corresponding to that memory location. The session id is then used as an index to the session list (e.g., session list 375) to determine the resource counter (e.g., mirror line availability counter 380).

At operation 1025, using the resource counter obtained in operation 1020, a determination is made whether there are remaining session resources. For example, if the resource count is zero, there may be no additional resources remaining. If there are no remaining session resources, then at operation 1030 the error bit is set in the TWFSE structure in the metadata corresponding to the memory location that is to be written in the metadata (e.g., metadata in metadata data structures 315, 317, or 319) and the write request may be serviced using the original block (instead of allocating a mirror block) at operation 1035. If there are additional resources, then at operation 1040 the resource counter may be decremented to reflect the allocation of a mirror block. At operation 1045 a mirror block may be allocated. At operation 1050 the TWFSE in the metadata structure may be updated to reflect the allocation of a mirror block. At operation 1055, the write request may be serviced using the mirror block allocated at operation 1045.

As noted, the above concepts provide a means to limit the memory resource usage of a single undo logging session to a predetermined amount. This is accomplished by utilizing a small list of resources available per undo logging session. The existing approach to providing rollback functionality uses one 64B meta state memory line for every 32 memory lines. Within the meta state several fields exist. The present disclosure, in some examples, adds two additional fields to the meta state line, a multi-Session bit and a Session ID field. Additionally, two structures are defined, a list of per session available resource counters, and a multi-session list. The per session available resource counters list is used it determine if additional resources are available at the time a memory line is written back from the host processor and needs to be mirrored for a possible future rollback. If the available resource counter is zero, then the write back is not mirrored and the meta state error bit is set for the memory line.

The present disclosure provides resource monitoring at the point resources are being consumed enforcing accurate, fine grained resource limits. The mechanism defined requires minimal hardware and can be performed without extending write back operation time. Previously identified mechanisms required performing an associative search across all active rollback extents resulting in prohibitive hardware resources to implement or prohibitive latency to perform the search.

As noted, the present disclosure defines hardware-based data structures that maintain the available resource count per active rollback session. A metadata data structure (e.g., 315, 317, 319) holds state for some number of memory locations (32 memory lines in the example of FIG. 3). The covered memory lines could be in the same active undo logging session extent, different extents for the same undologging session, or for different sessions. In the case that a single session is active within the covered memory locations of a same metadata structure, then the multi-session bit may be set to false, and the session ID field is assigned to the associated session list entry for the active rollback session. If multiple sessions are active within a metadata structure, then the multi-session bit may be set to true, and the Session ID field is set to a multi-session list entry. The multi-session list entry contains information to associate one or more memory locations with a session ID. The multi-session list contains pairs of memory location masks and session IDs. The memory line mask indicates which covered memory locations are associated with the paired Session ID. The session ID specifies which entry in the Session List represents the session's available resource counter.

In some examples, when a rollback session extent is removed from a meta state line then if a multi-session list is being used then the list entry mask is set to zero. When a write back occurs requiring a mirror block and the mirror line available count is zero then the E flags is set and the write back is not mirrored. In some examples, the new structures, multi-session list and session list, do not need to be stored in persistent memory. If a memory module goes offline, then all active rollback session will be aborted (rolled back) at which time the old resource counters are of no value.

FIG. 11 illustrates a block diagram of an example machine 1100 upon which any one or more of the techniques (e.g., methodologies) discussed herein may be performed. In alternative embodiments, the machine 1100 may operate as a standalone device or may be connected (e.g., networked) to other machines. In a networked deployment, the machine 1100 may operate in the capacity of a server machine, a client machine, or both in server-client network environments. In an example, the machine 1100 may act as a peer machine in peer-to-peer (P2P) (or other distributed) network environment. The machine 1100 may be in the form of a memory device, host device (such as a personal computer (PC), a tablet PC, a set-top box (STB), a personal digital assistant (PDA), a mobile telephone, a smart phone, a web appliance, a network router, switch, or bridge), or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations. The components of FIG. 11 are exemplary and fewer or additional components may be present in a memory device, a host device, or the like.

Examples, as described herein, may include, or may operate on one or more logic units, components, or mechanisms (hereinafter "components"). Components are tangible entities (e.g., hardware) capable of performing specified operations and may be configured or arranged in a certain manner. In an example, circuits may be arranged (e.g., internally or with respect to external entities such as other circuits) in a specified manner as a component. In an example, the whole or part of one or more computer systems (e.g., a standalone, client or server computer system) or one or more hardware processors may be configured by firmware or software (e.g., instructions, an application portion, or an application) as a component that operates to perform specified operations. In an example, the software may reside on a machine readable medium. In an example, the software, when executed by the underlying hardware of the component, causes the hardware to perform the specified operations of the component.

Accordingly, the term "component" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which component are temporarily configured, each of the components need not be instantiated at any one moment in time. For example, where the components comprise a general-purpose hardware processor configured using software, the general-purpose hardware processor may be configured as respective different components at different times. Software may accordingly configure a hardware processor, for example, to constitute a particular module at one instance of time and to constitute a different component at a different instance of time.

Machine (e.g., computer system) 1100 may include one or more hardware processors, such as processor 1102. Processor 1102 may be a central processing unit (CPU), a graphics processing unit (GPU), a hardware processor core, or any combination thereof. Machine 1100 may include a main memory 1104 and a static memory 1106, some or all of which may communicate with each other via an interlink (e.g., bus) 1108. Examples of main memory 1104 may include Synchronous Dynamic Random-Access Memory (SDRAM), such as Double Data Rate memory, such as DDR4 or DDR5. Interlink 1108 may be one or more different types of interlinks such that one or more components may be connected using a first type of interlink and one or more components may be connected using a second type of interlink. Example interlinks may include a memory bus, a peripheral component interconnect (PCI), a peripheral component interconnect express (PCIe) bus, a universal serial bus (USB), or the like.

The machine 1100 may further include a display unit 1110, an alphanumeric input device 1112 (e.g., a keyboard), and a user interface (UI) navigation device 1114 (e.g., a mouse). In an example, the display unit 1110, input device 1112 and UI navigation device 1114 may be a touch screen display. The machine 1100 may additionally include a storage device (e.g., drive unit) 1116, a signal generation device 1118 (e.g., a speaker), a network interface device 1120, and one or more sensors 1121, such as a global positioning system (GPS) sensor, compass, accelerometer, or other sensor. The machine 1100 may include an output controller 1128, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1116 may include a machine readable medium 1122 on which is stored one or more sets of data structures or instructions 1124 (e.g., software) embodying or utilized by any one or more of the techniques or functions described herein. The instructions 1124 may also reside, completely or at least partially, within the main memory 1104, within static memory 1106, or within the hardware processor 1102 during execution thereof by the machine 1100. In an example, one or any combination of the hardware processor 1102, the main memory 1104, the static memory 1106, or the storage device 1116 may constitute machine readable media.

While the machine readable medium 1122 is illustrated as a single medium, the term "machine readable medium" may include a single medium or multiple media (e.g., a centralized or distributed database, and/or associated caches and servers) configured to store the one or more instructions 1124.

The term "machine readable medium" may include any medium that is capable of storing, encoding, or carrying instructions for execution by the machine 1100 and that cause the machine 1100 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 1124 may further be transmitted or received over a communications network 1126 using a transmission medium via the network interface device 1120. The Machine 1100 may communicate with one or more other machines wired or wirelessly utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks such as an Institute of Electrical and Electronics Engineers (IEEE) 802.11 family of standards known as Wi-Fi®, an IEEE 802.15.4 family of standards, a 5G New Radio (NR) family of standards, a Long Term Evolution (LTE) family of standards, a Universal Mobile Telecommunications System (UMTS) family of standards, peer-to-peer (P2P) networks, among others. In an example, the network interface device 1120 may include one or more physical jacks (e.g., Ethernet, coaxial, or phone jacks) or one or more antennas to connect to the communications network 1126. In an example, the network interface device 1120 may include a plurality of antennas to wirelessly communicate using at least one of single-input multiple-output (SIMO), multiple-input multiple-output (MIMO), or multiple-input single-output (MISO) techniques. In some examples, the network interface device 1120 may wirelessly communicate using Multiple User MIMO techniques.

OTHER NOTES AND EXAMPLES

Example 1 is a method comprising: receiving, from an application, an indication of a start of an undo logging session, the indication of the start of the undo logging session identifying a set of physical memory locations of a memory device; receiving a write request for a first physical memory location of the memory device, the first physical memory location within the set of physical memory locations of the memory device, the first physical memory location not having been written to yet during the undo logging session; responsive to the write request: identifying a resource counter based upon a multi-session bit field and a session id field of a metadata data structure corresponding to the first physical memory location; determining that the undo logging session has remaining memory resources based upon the resource counter; responsive to determining that the undo logging session has remaining resources: reducing the resource counter; allocating a second physical memory location of the memory device; and updating at least one bit of the metadata data structure from indicating that memory requests are to be serviced at the first physical memory location to indicate that memory requests are to be serviced at the second physical memory location; and servicing the write request using the second physical memory location.

In Example 2, the subject matter of Example 1 includes, wherein the memory device is a persistent memory device connected to a host using an interface configured for a Compute Express Link (CXL) protocol.

In Example 3, the subject matter of Examples 1-2 includes, wherein identifying the resource counter based upon the multi-session bit field and the session id field of the metadata data structure corresponding to the first physical memory location comprises: determining that the multi-session bit field is set to a value indicating that no multi-session undo logging is active for any memory locations corresponding to the metadata data structure; responsive to determining that the multi-session bit field is set to a value indicating that no multi-session undo logging is active for any memory locations corresponding to the metadata data structure, accessing a session id value in the metadata data structure; and using the session id value in the metadata data structure as an index to a session list structure, the session list structure storing the resource counter.

In Example 4, the subject matter of Examples 1-3 includes, wherein identifying the resource counter based upon the multi-session bit field and the session id field of the metadata data structure corresponding to the first physical memory location comprises: determining that the multi-session bit field is set to a value indicating that multi-session undo logging is active for memory locations corresponding to the metadata data structure; responsive to determining that the multi-session bit field is set to a value indicating that multi-session undo logging is active for memory locations corresponding to the metadata data structure, accessing an index value in the metadata data structure; using the index value in the metadata data structure as an index to a multi-session list structure, the multi-session list structure storing a plurality of data pairs comprising a mask value and a session id value, each of the mask values having a corresponding bit for each of the memory locations corresponding to the metadata data structure; identifying a data pair of the plurality of data pairs where the mask value indicates that the first physical memory location is part of the undo logging session; and utilizing the session id value from the identified data pair as an index to a session list structure, the session list structure storing the resource counter.

In Example 5, the subject matter of Examples 1-4 includes, receiving a second write request for a second physical memory location of the memory device; responsive to the second write request: identifying the resource counter based upon a second multi-session bit field and a second session id field of a second metadata data structure corresponding to the second physical memory location; determining that the undo logging session has no remaining reserved resources based upon the resource counter; and responsive to determining that the undo logging session has no remaining resources: marking an error field in the second metadata data structure corresponding to the second physical memory location.

In Example 6, the subject matter of Examples 1-5 includes, setting the resource counter for the undo logging session in a session list to a specified value responsive to receiving the indication of the start of the undo logging session.

In Example 7, the subject matter of Examples 1-6 includes, wherein the indication of the start of the undo logging session includes a number of memory blocks allocated to the undo logging session and wherein the method further comprises setting the resource counter for the undo logging session in a session list to the number of memory blocks allocated to the undo logging session included in the indication of the start of the undo logging session.

Example 8 is a computing device comprising: a processor; a memory, the memory storing instructions, which when executed by the processor, causes the computing device to perform operations comprising: receiving, from an application, an indication of a start of an undo logging session, the indication of the start of the undo logging session identifying a set of physical memory locations of a memory device; receiving a write request for a first physical memory location of the memory device, the first physical memory location within the set of physical memory locations of the memory device, the first physical memory location not having been written to yet during the undo logging session; responsive to the write request: identifying a resource counter based upon a multi-session bit field and a session id field of a metadata data structure corresponding to the first physical memory location; determining that the undo logging session has remaining memory resources based upon the resource counter; responsive to determining that the undo logging session has remaining resources: reducing the resource counter; allocating a second physical memory location of the memory device; and updating at least one bit of the metadata data structure from indicating that memory requests are to be serviced at the first physical memory location to indicate that memory requests are to be serviced at the second physical memory location; and servicing the write request using the second physical memory location.

In Example 9, the subject matter of Example 8 includes, wherein the memory device is a persistent memory device connected to a host using an interface configured for a Compute Express Link (CXL) protocol.

In Example 10, the subject matter of Examples 8-9 includes, wherein the operations of identifying the resource counter based upon the multi-session bit field and the session id field of the metadata data structure corresponding to the first physical memory location comprises: determining that the multi-session bit field is set to a value indicating that no multi-session undo logging is active for any memory locations corresponding to the metadata data structure; responsive to determining that the multi-session bit field is set to a value indicating that no multi-session undo logging is active for any memory locations corresponding to the metadata data structure, accessing a session id value in the metadata data structure; and using the session id value in the metadata data structure as an index to a session list structure, the session list structure storing the resource counter.

In Example 11, the subject matter of Examples 8-10 includes, wherein the operations of identifying the resource counter based upon the multi-session bit field and the session id field of the metadata data structure corresponding to the first physical memory location comprises: determining that the multi-session bit field is set to a value indicating that multi-session undo logging is active for memory locations corresponding to the metadata data structure; responsive to determining that the multi-session bit field is set to a value indicating that multi-session undo logging is active for memory locations corresponding to the metadata data structure, accessing an index value in the metadata data structure; using the index value in the metadata data structure as an index to a multi-session list structure, the multi-session list structure storing a plurality of data pairs comprising a mask value and a session id value, each of the mask values having a corresponding bit for each of the memory locations corresponding to the metadata data structure; identifying a data pair of the plurality of data pairs where the mask value indicates that the first physical memory location is part of the undo logging session; and utilizing the session id value from the identified data pair as an index to a session list structure, the session list structure storing the resource counter.

In Example 12, the subject matter of Examples 8-11 includes, wherein the operations further comprise: receiving a second write request for a second physical memory location of the memory device; responsive to the second write request: identifying the resource counter based upon a second multi-session bit field and a second session id field of a second metadata data structure corresponding to the second physical memory location; determining that the undo logging session has no remaining reserved resources based upon the resource counter; and responsive to determining that the undo logging session has no remaining resources: marking an error field in the second metadata data structure corresponding to the second physical memory location.

In Example 13, the subject matter of Examples 8-12 includes, wherein the operations further comprise setting the resource counter for the undo logging session in a session list to a specified value responsive to receiving the indication of the start of the undo logging session.

In Example 14, the subject matter of Examples 8-13 includes, wherein the indication of the start of the undo logging session includes a number of memory blocks allocated to the undo logging session and wherein the operations further comprise setting the resource counter for the undo logging session in a session list to the number of memory blocks allocated to the undo logging session included in the indication of the start of the undo logging session.

Example 15 is a non-transitory machine-readable medium, storing instructions, which when executed by a machine, causes the machine to perform operations comprising: receiving, from an application, an indication of a start of an undo logging session, the indication of the start of the undo logging session identifying a set of physical memory locations of a memory device; receiving a write request for a first physical memory location of the memory device, the first physical memory location within the set of physical memory locations of the memory device, the first physical memory location not having been written to yet during the undo logging session; responsive to the write request: identifying a resource counter based upon a multi-session bit field and a session id field of a metadata data structure corresponding to the first physical memory location; determining that the undo logging session has remaining memory resources based upon the resource counter; responsive to determining that the undo logging session has remaining resources: reducing the resource counter; allocating a second physical memory location of the memory device; and updating at least one bit of the metadata data structure from indicating that memory requests are to be serviced at the first physical memory location to indicate that memory requests are to be serviced at the second physical memory location; and servicing the write request using the second physical memory location.

In Example 16, the subject matter of Example 15 includes, wherein the memory device is a persistent memory device connected to a host using an interface configured for a Compute Express Link (CXL) protocol.

In Example 17, the subject matter of Examples 15-16 includes, wherein the operations of identifying the resource counter based upon the multi-session bit field and the session id field of the metadata data structure corresponding to the first physical memory location comprises: determining that the multi-session bit field is set to a value indicating that no multi-session undo logging is active for any memory locations corresponding to the metadata data structure; responsive to determining that the multi-session bit field is set to a value indicating that no multi-session undo logging is active for any memory locations corresponding to the metadata data structure, accessing a session id value in the metadata data structure; and using the session id value in the metadata data structure as an index to a session list structure, the session list structure storing the resource counter.

In Example 18, the subject matter of Examples 15-17 includes, wherein the operations of identifying the resource counter based upon the multi-session bit field and the session id field of the metadata data structure corresponding to the first physical memory location comprises: determining that the multi-session bit field is set to a value indicating that multi-session undo logging is active for memory locations corresponding to the metadata data structure; responsive to determining that the multi-session bit field is set to a value indicating that multi-session undo logging is active for memory locations corresponding to the metadata data structure, accessing an index value in the metadata data structure; using the index value in the metadata data structure as an index to a multi-session list structure, the multi-session list structure storing a plurality of data pairs comprising a mask value and a session id value, each of the mask values having a corresponding bit for each of the memory locations corresponding to the metadata data structure; identifying a data pair of the plurality of data pairs where the mask value indicates that the first physical memory location is part of the undo logging session; and utilizing the session id value from the identified data pair as an index to a session list structure, the session list structure storing the resource counter.

In Example 19, the subject matter of Examples 15-18 includes, wherein the operations further comprise: receiving a second write request for a second physical memory location of the memory device; responsive to the second write request: identifying the resource counter based upon a second multi-session bit field and a second session id field of a second metadata data structure corresponding to the second physical memory location; determining that the undo logging session has no remaining reserved resources based upon the resource counter; and responsive to determining that the undo logging session has no remaining resources: marking an error field in the second metadata data structure corresponding to the second physical memory location.

In Example 20, the subject matter of Examples 15-19 includes, wherein the operations further comprise setting the resource counter for the undo logging session in a session list to a specified value responsive to receiving the indication of the start of the undo logging session.

In Example 21, the subject matter of Examples 15-20 includes, wherein the indication of the start of the undo logging session includes a number of memory blocks allocated to the undo logging session and wherein the operations further comprise setting the resource counter for the undo logging session in a session list to the number of memory blocks allocated to the undo logging session included in the indication of the start of the undo logging session.

Example 22 is a device comprising: means for receiving, from an application, an indication of a start of an undo logging session, the indication of the start of the undo logging session identifying a set of physical memory locations of a memory device; means for receiving a write request for a first physical memory location of the memory device, the first physical memory location within the set of physical memory locations of the memory device, the first physical memory location not having been written to yet during the undo logging session; means for, responsive to the write request: identifying a resource counter based upon a multi-session bit field and a session id field of a metadata data structure corresponding to the first physical memory location; determining that the undo logging session has remaining memory resources based upon the resource counter; responsive to determining that the undo logging session has remaining resources: reducing the resource counter; allocating a second physical memory location of the memory device; and updating at least one bit of the metadata data structure from indicating that memory requests are to be serviced at the first physical memory location to indicate that memory requests are to be serviced at the second physical memory location; and means for servicing the write request using the second physical memory location.

In Example 23, the subject matter of Example 22 includes, wherein the memory device is a persistent memory device connected to a host using an interface configured for a Compute Express Link (CXL) protocol.

In Example 24, the subject matter of Examples 22-23 includes, wherein the means for identifying the resource counter based upon the multi-session bit field and the session id field of the metadata data structure corresponding to the first physical memory location comprises: means for determining that the multi-session bit field is set to a value indicating that no multi-session undo logging is active for any memory locations corresponding to the metadata data structure; means for, responsive to determining that the multi-session bit field is set to a value indicating that no multi-session undo logging is active for any memory locations corresponding to the metadata data structure, accessing a session id value in the metadata data structure; and means for using the session id value in the metadata data structure as an index to a session list structure, the session list structure storing the resource counter.

In Example 25, the subject matter of Examples 22-24 includes, wherein the means for identifying the resource counter based upon the multi-session bit field and the session id field of the metadata data structure corresponding to the first physical memory location comprises: means for determining that the multi-session bit field is set to a value indicating that multi-session undo logging is active for memory locations corresponding to the metadata data structure; means for, responsive to determining that the multi-session bit field is set to a value indicating that multi-session undo logging is active for memory locations corresponding to the metadata data structure, accessing an index value in the metadata data structure; means for using the index value in the metadata data structure as an index to a multi-session list structure, the multi-session list structure storing a plurality of data pairs comprising a mask value and a session id value, each of the mask values having a corresponding bit for each of the memory locations corresponding to the metadata data structure; means for identifying a data pair of the plurality of data pairs where the mask value indicates that the first physical memory location is part of the undo logging session; and means for utilizing the session id value from the identified data pair as an index to a session list structure, the session list structure storing the resource counter.

In Example 26, the subject matter of Examples 22-25 includes, means for receiving a second write request for a second physical memory location of the memory device; means for, responsive to the second write request: identifying the resource counter based upon a second multi-session bit field and a second session id field of a second metadata data structure corresponding to the second physical memory location; determining that the undo logging session has no remaining reserved resources based upon the resource counter; and responsive to determining that the undo logging session has no remaining resources: marking an error field in the second metadata data structure corresponding to the second physical memory location.

In Example 27, the subject matter of Examples 22-26 includes, means for setting the resource counter for the undo logging session in a session list to a specified value responsive to receiving the indication of the start of the undo logging session.

In Example 28, the subject matter of Examples 22-27 includes, wherein the indication of the start of the undo logging session includes a number of memory blocks allocated to the undo logging session and wherein the device further comprises means for setting the resource counter for the undo logging session in a session list to the number of memory blocks allocated to the undo logging session included in the indication of the start of the undo logging session.

Example 29 is at least one machine-readable medium including instructions that, when executed by processing circuitry, cause the processing circuitry to perform operations to implement of any of Examples 1-28.

Example 30 is an apparatus comprising means to implement of any of Examples 1-28.

Example 31 is a system to implement of any of Examples 1-28.

Example 32 is a method to implement of any of Examples 1-28.

What is claimed is:

1. A method comprising:
    receiving, from an application, an indication of a start of an undo logging session, the indication of the start of the undo logging session identifying a set of physical memory locations of a memory device;
    receiving a write request for a first physical memory location of the memory device, the first physical memory location within the set of physical memory locations of the memory device, the first physical memory location not having been written to yet during the undo logging session;
    responsive to the write request:
        identifying a resource counter based upon a multi-session bit field and a session id field of a metadata data structure corresponding to the first physical memory location;
        determining that the undo logging session has remaining memory resources based upon the resource counter;
        responsive to determining that the undo logging session has remaining resources:
            reducing the resource counter;
            allocating a second physical memory location of the memory device; and updating at least one bit of the metadata data structure from indicating that memory requests are to be serviced at the first physical memory location to indicate that memory requests are to be serviced at the second physical memory location; and servicing the write request using the second physical memory location.

2. The method of claim 1, wherein the memory device is a persistent memory device connected to a host using an interface configured for a Compute Express Link (CXL) protocol.

3. The method of claim 1, wherein identifying the resource counter based upon the multi-session bit field and the session id field of the metadata data structure corresponding to the first physical memory location comprises:

determining that the multi-session bit field is set to a value indicating that no multi-session undo logging is active for any memory locations corresponding to the metadata data structure;

responsive to determining that the multi-session bit field is set to a value indicating that no multi-session undo logging is active for any memory locations corresponding to the metadata data structure, accessing a session id value in the metadata data structure; and using the session id value in the metadata data structure as an index to a session list structure, the session list structure storing the resource counter.

4. The method of claim 1, wherein identifying the resource counter based upon the multi-session bit field and the session id field of the metadata data structure corresponding to the first physical memory location comprises:

determining that the multi-session bit field is set to a value indicating that multi-session undo logging is active for memory locations corresponding to the metadata data structure;

responsive to determining that the multi-session bit field is set to a value indicating that multi-session undo logging is active for memory locations corresponding to the metadata data structure, accessing an index value in the metadata data structure;

using the index value in the metadata data structure as an index to a multi-session list structure, the multi-session list structure storing a plurality of data pairs comprising a mask value and a session id value, each of the mask values having a corresponding bit for each of the memory locations corresponding to the metadata data structure;

identifying a data pair of the plurality of data pairs where the mask value indicates that the first physical memory location is part of the undo logging session; and utilizing the session id value from the identified data pair as an index to a session list structure, the session list structure storing the resource counter.

5. The method of claim 1, further comprising:

receiving a second write request for a second physical memory location of the memory device;

responsive to the second write request:

identifying the resource counter based upon a second multi-session bit field and a second session id field of a second metadata data structure corresponding to the second physical memory location;

determining that the undo logging session has no remaining reserved resources based upon the resource counter; and responsive to determining that the undo logging session has no remaining resources:

marking an error field in the second metadata data structure corresponding to the second physical memory location.

6. The method of claim 1, further comprising setting the resource counter for the undo logging session in a session list to a specified value responsive to receiving the indication of the start of the undo logging session.

7. The method of claim 1, wherein the indication of the start of the undo logging session includes a number of memory blocks allocated to the undo logging session and wherein the method further comprises setting the resource counter for the undo logging session in a session list to the number of memory blocks allocated to the undo logging session included in the indication of the start of the undo logging session.

8. A computing device comprising:

a processor;

a memory, the memory storing instructions, which when executed by the processor, causes the computing device to perform operations comprising:

receiving, from an application, an indication of a start of an undo logging session, the indication of the start of the undo logging session identifying a set of physical memory locations of a memory device;

receiving a write request for a first physical memory location of the memory device, the first physical memory location within the set of physical memory locations of the memory device, the first physical memory location not having been written to yet during the undo logging session;

responsive to the write request:

identifying a resource counter based upon a multi-session bit field and a session id field of a metadata data structure corresponding to the first physical memory location;

determining that the undo logging session has remaining memory resources based upon the resource counter;

responsive to determining that the undo logging session has remaining resources:

reducing the resource counter;

allocating a second physical memory location of the memory device; and updating at least one bit of the metadata data structure from indicating that memory requests are to be serviced at the first physical memory location to indicate that memory requests are to be serviced at the second physical memory location; and servicing the write request using the second physical memory location.

9. The computing device of claim 8, wherein the memory device is a persistent memory device connected to a host using an interface configured for a Compute Express Link (CXL) protocol.

10. The computing device of claim 8, wherein the operations of identifying the resource counter based upon the multi-session bit field and the session id field of the metadata data structure corresponding to the first physical memory location comprises:

determining that the multi-session bit field is set to a value indicating that no multi-session undo logging is active for any memory locations corresponding to the metadata data structure;

responsive to determining that the multi-session bit field is set to a value indicating that no multi-session undo logging is active for any memory locations corresponding to the metadata data structure, accessing a session id value in the metadata data structure; and
using the session id value in the metadata data structure as an index to a session list structure, the session list structure storing the resource counter.

11. The computing device of claim 8, wherein the operations of identifying the resource counter based upon the multi-session bit field and the session id field of the metadata data structure corresponding to the first physical memory location comprises:
determining that the multi-session bit field is set to a value indicating that multi-session undo logging is active for memory locations corresponding to the metadata data structure;
responsive to determining that the multi-session bit field is set to a value indicating that multi-session undo logging is active for memory locations corresponding to the metadata data structure, accessing an index value in the metadata data structure;
using the index value in the metadata data structure as an index to a multi-session list structure, the multi-session list structure storing a plurality of data pairs comprising a mask value and a session id value, each of the mask values having a corresponding bit for each of the memory locations corresponding to the metadata data structure;
identifying a data pair of the plurality of data pairs where the mask value indicates that the first physical memory location is part of the undo logging session; and
utilizing the session id value from the identified data pair as an index to a session list structure, the session list structure storing the resource counter.

12. The computing device of claim 8, wherein the operations further comprise:
receiving a second write request for a second physical memory location of the memory device;
responsive to the second write request:
identifying the resource counter based upon a second multi-session bit field and a second session id field of a second metadata data structure corresponding to the second physical memory location;
determining that the undo logging session has no remaining reserved resources based upon the resource counter; and
responsive to determining that the undo logging session has no remaining resources:
marking an error field in the second metadata data structure corresponding to the second physical memory location.

13. The computing device of claim 8, wherein the operations further comprise setting the resource counter for the undo logging session in a session list to a specified value responsive to receiving the indication of the start of the undo logging session.

14. The computing device of claim 8, wherein the indication of the start of the undo logging session includes a number of memory blocks allocated to the undo logging session and wherein the operations further comprise setting the resource counter for the undo logging session in a session list to the number of memory blocks allocated to the undo logging session included in the indication of the start of the undo logging session.

15. A non-transitory machine-readable medium, storing instructions, which when executed by a machine, causes the machine to perform operations comprising:
receiving, from an application, an indication of a start of an undo logging session, the indication of the start of the undo logging session identifying a set of physical memory locations of a memory device;
receiving a write request for a first physical memory location of the memory device, the first physical memory location within the set of physical memory locations of the memory device, the first physical memory location not having been written to yet during the undo logging session;
responsive to the write request:
identifying a resource counter based upon a multi-session bit field and a session id field of a metadata data structure corresponding to the first physical memory location;
determining that the undo logging session has remaining memory resources based upon the resource counter;
responsive to determining that the undo logging session has remaining resources:
reducing the resource counter;
allocating a second physical memory location of the memory device; and
updating at least one bit of the metadata data structure from indicating that memory requests are to be serviced at the first physical memory location to indicate that memory requests are to be serviced at the second physical memory location; and
servicing the write request using the second physical memory location.

16. The non-transitory machine-readable medium of claim 15, wherein the memory device is a persistent memory device connected to a host using an interface configured for a Compute Express Link (CXL) protocol.

17. The non-transitory machine-readable medium of claim 15, wherein the operations of identifying the resource counter based upon the multi-session bit field and the session id field of the metadata data structure corresponding to the first physical memory location comprises:
determining that the multi-session bit field is set to a value indicating that no multi-session undo logging is active for any memory locations corresponding to the metadata data structure;
responsive to determining that the multi-session bit field is set to a value indicating that no multi-session undo logging is active for any memory locations corresponding to the metadata data structure, accessing a session id value in the metadata data structure; and
using the session id value in the metadata data structure as an index to a session list structure, the session list structure storing the resource counter.

18. The non-transitory machine-readable medium of claim 15, wherein the operations of identifying the resource counter based upon the multi-session bit field and the session id field of the metadata data structure corresponding to the first physical memory location comprises:
determining that the multi-session bit field is set to a value indicating that multi-session undo logging is active for memory locations corresponding to the metadata data structure;
responsive to determining that the multi-session bit field is set to a value indicating that multi-session undo logging is active for memory locations corresponding to the metadata data structure, accessing an index value in the metadata data structure;
using the index value in the metadata data structure as an index to a multi-session list structure, the multi-session list structure storing a plurality of data pairs comprising a mask value and a session id value, each of the mask values having a corresponding bit for each of the memory locations corresponding to the metadata data structure;

identifying a data pair of the plurality of data pairs where the mask value indicates that the first physical memory location is part of the undo logging session; and utilizing the session id value from the identified data pair as an index to a session list structure, the session list structure storing the resource counter.

19. The non-transitory machine-readable medium of claim 15, wherein the operations further comprise:

receiving a second write request for a second physical memory location of the memory device;

responsive to the second write request:

identifying the resource counter based upon a second multi-session bit field and a second session id field of a second metadata data structure corresponding to the second physical memory location;

determining that the undo logging session has no remaining reserved resources based upon the resource counter; and responsive to determining that the undo logging session has no remaining resources:

marking an error field in the second metadata data structure corresponding to the second physical memory location.

20. The non-transitory machine-readable medium of claim 15, wherein the operations further comprise setting the resource counter for the undo logging session in a session list to a specified value responsive to receiving the indication of the start of the undo logging session.

* * * * *